US012702873B2

(12) United States Patent

Kim et al.

(10) Patent No.: US 12,702,873 B2

(45) **Date of Patent: *Aug. 11, 2026**

(54) MASK APPARATUS

(71) Applicant: LG Electronics Inc., Seoul (KR)

(72) Inventors: Hojung Kim, Seoul (KR); Yeongcheol Mun, Seoul (KR); Yongmin Kim, Seoul (KR); Chiyoung Choi, Seoul (KR); Sejin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1014 days.

This patent is subject to a terminal disclaimer.

(21) Appl. No.: 17/868,107

(22) Filed: Jul. 19, 2022

(65) Prior Publication Data

US 2023/0012551 A1 Jan. 19, 2023

(30) Foreign Application Priority Data

Jul. 19, 2021 (KR) ........................ 10-2021-0093992

(51) Int. Cl.

*A62B 18/08* (2006.01)
*A62B 18/00* (2006.01)

(Continued)

(52) U.S. Cl.

CPC ............ *A62B 18/08* (2013.01); *A62B 18/025* (2013.01); *A62B 23/02* (2013.01); *A62B 18/006* (2013.01)

(58) Field of Classification Search

CPC ....... A62B 18/08; A62B 18/02; A62B 18/025; A62B 23/02; A62B 18/006; A62B 18/084;

(Continued)

(56) References Cited

U.S. PATENT DOCUMENTS 2,939,458 A * 6/1960 Lundquist ............ A62B 18/025 128/206.25
5,349,949 A * 9/1994 Schegerin .............. A62B 18/08 128/201.24

(Continued)

FOREIGN PATENT DOCUMENTS

CN 203302289 11/2013
CN 105363141 A 3/2016

(Continued)

OTHER PUBLICATIONS

English translation of the specification of CN 212817681, machined translated by espacenet.com.*

(Continued)

*Primary Examiner* — Tu A Vo

(74) *Attorney, Agent, or Firm* — Fish & Richardson P.C.

(57) ABSTRACT

A mask apparatus includes a mask body that defines a suction hole and a discharge hole, a face guard detachably coupled to a rear surface of the mask body by magnetic force, and an air cleaning module configured to filter external air and supply the filtered air to a breathing space. The face guard includes magnetic bodies disposed at a front surface of the face guard. The magnetic bodies include a first magnetic body disposed at a center of an upper portion of the front surface of the face guard, and a second magnetic body and a third magnetic body that are disposed at a lower portion of the front surface. The second and third magnetic bodies are spaced apart from each other and disposed at sides of a center of the lower portion of the front surface of the face guard, respectively.

12 Claims, 18 Drawing Sheets

(51) Int. Cl.
*A62B 18/02* (2006.01)
*A62B 23/02* (2006.01)

(58) Field of Classification Search
CPC .......... A61M 16/0622; A61M 16/0616; A41D 13/11–1192; A41F 1/002; Y10T 24/32; A44D 2203/00; A61F 9/068
See application file for complete search history.

(56) References Cited

U.S. PATENT DOCUMENTS

| | | | | | |
|---|---|---|---|---|---|
| 5,570,689 | A * | 11/1996 | Starr | A61M 16/0633 | 128/207.11 |
| 7,793,987 | B1 * | 9/2010 | Busch | A61M 16/161 | 285/9.1 |
| 8,042,542 | B2 * | 10/2011 | Ging | A61M 16/0616 | 128/206.28 |
| 2003/0196656 | A1 * | 10/2003 | Moore | A61M 16/0622 | 128/201.22 |
| 2003/0196658 | A1 * | 10/2003 | Ging | A61M 16/0666 | 128/201.22 |
| 2004/0003810 | A1 * | 1/2004 | Templeton | A62B 17/04 | 128/201.25 |
| 2005/0155604 | A1 * | 7/2005 | Ging | A61M 16/0616 | 128/207.11 |
| 2006/0174892 | A1 * | 8/2006 | Leksutin | A62B 18/084 | 128/207.18 |
| 2008/0230068 | A1 * | 9/2008 | Rudolph | A61M 16/0683 | 128/206.28 |
| 2008/0257354 | A1 * | 10/2008 | Davidson | A61M 16/06 | 128/206.24 |
| 2015/0034098 | A1 * | 2/2015 | Schumacher | A41D 13/1138 | 128/863 |
| 2015/0250972 | A1 * | 9/2015 | Haibach | A61M 16/0622 | 128/202.27 |
| 2015/0335846 | A1 * | 11/2015 | Romagnoli | A61M 16/06 | 128/201.13 |
| 2017/0333660 | A1 * | 11/2017 | Haibach | A61M 16/0683 | |
| 2018/0140796 | A1 * | 5/2018 | Haibach | A61M 11/00 | |
| 2019/0175863 | A1 * | 6/2019 | Hocking | A61M 16/0616 | |
| 2020/0197649 | A1 * | 6/2020 | Haibach | A61M 16/0616 | |
| 2020/0206546 | A1 * | 7/2020 | Kim | A62B 23/025 | |

FOREIGN PATENT DOCUMENTS

| | | | | | |
|---|---|---|---|---|---|
| CN | 206867523 | U | | 1/2018 | |
| CN | 107961456 | A | * | 4/2018 | A62B 9/06 |
| CN | 110652663 | A | | 1/2020 | |
| CN | 111135495 | A | | 5/2020 | |
| CN | 211983904 | | | 11/2020 | |
| CN | 212817681 | U | * | 3/2021 | |
| JP | 3205108 | | | 7/2016 | |
| KR | 20100055202 | | | 5/2010 | |
| KR | 20190111386 | | | 10/2019 | |
| KR | 20190111386 | A | * | 10/2019 | A62B 9/003 |
| KR | 10-2151164 | | | 9/2020 | |
| KR | 10-2020-115946 | | | 10/2020 | |
| KR | 20210004492 | | | 1/2021 | |

OTHER PUBLICATIONS

English translation of the claims of CN 212817681, machined translated by espacenet.com.*

Office Action in Korean Appln. No. 10-2021-0093992, dated Jul. 19, 2022, 20 pages (with English translation).

Notice of Allowance in Chinese Appln. No. 202210802617.X, mailed on Jun. 30, 2025, 7 pages (with English translation).

Extended European Search Report in European Appln. No. 22185394.8, mailed on Dec. 6, 2022, 7 pages.

Office Action in Chinese Appin. No. 202210802617.X, mailed on Jan. 25, 2025, 17 pages.

* cited by examiner

MASK APPARATUS

CROSS-REFERENCE TO RELATED APPLICATIONS

The present application claims priority under 35 U.S.C. 119 and 35 U.S.C. 365 to Korean Patent Application No. 10-2021-0093992, filed on Jul. 19, 2021, which is hereby incorporated by reference in its entirety.

TECHNICAL FIELD

The present disclosure relates to a mask apparatus.

BACKGROUND

A mask may be defined as a hygiene product that covers the user's nose and mouth to filter harmful substances including germs and dust contained in the air when the user inhales and to minimize spreads of virus or bad breath discharged when the user exhales to nearby people.

In some cases, where the virus is highly spreadable and highly contagious, it is recommended that individuals wear a mask to go out for safety in order to minimize transmission.

Various types and forms of masks are released in the market, and in particular, in order to minimize the harmful substances contained in the air from directly entering the mask wearer's respiratory tract, masks may include a filter module. In some cases, in order to facilitate a flow of air passing through the mask when the user inhales or exhales, a mask may include a fan. For instance, the mask may include a filter so that the harmful substances contained in external air are filtered and then introduced into the user's respiratory tract.

In some cases, the mask may include a pressure sensing unit that senses a pressure in the breathing space defined between the mask and a user's face, and a fan module of which a rotation speed is variable according to the pressure sensed by the pressure sensing unit, and thus, it helps the user to breathe comfortably even while wearing the mask.

The masks may have a structure in which an air suction hole is defined in a front side of the mask, and an air discharge hole is defined in a rear surface of the mask, in particular, a rear surface of the mask, which corresponds to a point that is close to the user's mouth or nose. Here, the front surface of the mask may refer to a portion exposed to the outside, and the rear surface of the mask may refer to a portion that is in close contact with the user's face.

For example, the air suction hole of the mask may be defined in the front surface that is close to a center of the mask or in the front surface that is close to both side ends of the mask, and the air suction hole may be defined in the front surface that is close to both the side ends of the mask.

In some cases, where the air suction hole is defined in the front surface of the mask, and the air discharge hole is defined in the rear surface of the mask, a flow conversion of air may occur excessively while external air is introduced into the mask to pass through the fan and filter and then is discharged to the user's respiratory tract through the air discharge hole.

In some cases, as the number of flow conversions of the suctioned air increases, flow resistance may increase, and as a result, a load of the fan may increase. In addition, as the load of the fan increases, power consumption of a battery supplying power to the fan may increase. In some cases, as the number of flow conversions of the suctioned air increases, flow noise may increase.

In some cases, when a user of the mask with the air suction hole defined in the front surface of the mask takes off the mask in a state in which the air suction hole is faced upward or forward, dust may be introduced through the air suction hole.

In some cases, the air suction hole in the front surface of the mask may affect an outer appearance. In some examples, a suction hole cover may be mounted to prevent the air suction hole from being exposed to the outside. In some cases, the suction hole cover may be separated from the mask or damaged due to external force or impacts.

In some cases, the suction hole may be defined at a portion other than the mask body. For example, the suction hole may be defined in a separate air cleaning module that is detachably or foldably coupled to a side surface of the mask body. In some cases, flow resistance may increase while the air suctioned into the air cleaning module reaches the discharge hole defined in the center of the mask body.

SUMMARY

According to one aspect of the subject matter described in this application, a mask apparatus includes a mask body that defines a suction hole configured to receive external air from an outside of the mask apparatus and a discharge hole configured to discharge air to the outside, where the mask body includes a rear body and a front body that is coupled to a front surface of the rear body. The mask apparatus further includes a face guard that is detachably coupled to a rear surface of the rear body by magnetic force, that is configured to be in contact with a face of a user, and that defines a breathing space. The mask apparatus further includes an air cleaning module disposed at the rear body and configured to filter the external air received through the suction hole and to supply the filtered air to the breathing space. The face guard includes a coupling portion that faces the rear surface of the rear body, a plurality of magnetic bodies disposed at a front surface of the coupling portion, a close contact portion configured to be in contact with the face of the user, and a connection portion that connects the coupling portion to the close contact portion, the connection portion defining one or more widths of the face guard in a front-rear direction. The plurality of magnetic bodies include a first magnetic body that is disposed at an upper portion of the front surface of the coupling portion and that is disposed at a center of the upper portion of the front surface of the coupling portion, and a second magnetic body and a third magnetic body that are disposed at a lower portion of the front surface of the coupling portion. The second and third magnetic bodies are spaced apart from each other and disposed at sides of a center of the lower portion of the front surface of the coupling portion, respectively.

Implementations according to this aspect can include one or more of the following features. For example, the first magnetic body can be disposed at a position corresponding to an upper side of the air cleaning module, and the second and third magnetic bodies can be disposed at positions corresponding to a lower side of the air cleaning module. In some examples, the suction hole can be defined outside the breathing space, and the discharge hole can be defined inside the breathing space. In some examples, the first magnetic body can be disposed at a position corresponding to an upper side of the discharge hole, and the second and third magnetic bodies can be disposed at positions corresponding to a lower side of the discharge hole.

In some implementations, the face guard can define a plurality of magnetic body mounting portions that receive the plurality of magnetic bodies, respectively. For example, each of the plurality of magnetic body mounting portions can protrude from the front surface of the coupling portion and be attached to the rear surface of the rear body. In some examples, the rear body can include a plurality of magnets that are disposed at the front surface of the rear body, and a plurality of magnet mounting portions that protrude forward from the front surface of the rear body, where each of the plurality of magnet mounting portions receives one of the plurality of magnets. The rear body can define a plurality of magnet mounting grooves at the rear surface of the rear body, where each of the plurality of magnet mounting grooves is defined at a position corresponding to a rear surface of one of the plurality of magnet mounting portions.

In some examples, each of the plurality of magnetic body mounting portions can include a mounting portion body that protrudes forward from the front surface of the coupling portion toward one of the plurality of magnet mounting grooves, and an insertion guide rib disposed inside the mounting portion body. The mounting portion body and the insertion guide rib can be spaced apart from each other to thereby define an insertion hole that receives one of the plurality of magnetic bodies between the mounting portion body and the insertion guide rib.

In some implementations, the mounting portion body can define an inner space that accommodates the insertion guide rib and one of the plurality of magnetic bodies, and a front opening that is in communication with the inner space and faces the rear surface of the rear body. In some examples, each of the plurality of magnetic bodies can be separably coupled to the mounting portion body of one of the plurality of magnetic body mounting portions through the front opening of the one of the plurality of magnetic body mounting portions.

In some implementations, the air cleaning module can include a filter housing that is disposed at the rear body and defines the suction hole, where the filter housing is configured to accommodate a filter at the suction hole. In some examples, the face guard can be disposed at a center portion of the rear body, and the filter housing can be disposed at at least one side of the center portion of the rear body, where the face guard separates the discharge hole from the suction hole.

In some implementations, the mask apparatus can further include a plurality of magnets that are disposed at the rear body and configured to provide the magnetic force to the plurality of magnetic bodies, respectively, to thereby couple the face guard to the rear body, where each of the plurality of magnetic bodies is made of iron or stainless steel.

According to another aspect, a mask apparatus includes a mask body that defines a suction hole configured to receive external air from an outside of the mask apparatus and a discharge hole configured to discharge air to the outside, where the mask body includes a rear body and a front body that is coupled to a front surface of the rear body. The mask apparatus further includes a face guard that is detachably coupled to a rear surface of the rear body by magnetic force, that is configured to contact a face of a user, and that defines a breathing space, and a plurality of magnets disposed at the rear surface of the rear body and configured to couple the face guard to the rear body. The face guard includes a plurality of magnetic bodies that are made of iron or stainless steel and disposed at positions facing the plurality of magnets. The plurality of magnetic bodies includes a first magnetic body that is disposed at an upper portion of a front surface of the face guard and that is disposed at a center of the upper portion of the front surface of the face guard, and a second magnetic body and a third magnetic body that are disposed at a lower portion of the front surface of the face guard, where the second and third magnetic bodies are spaced apart from each other and disposed at sides of a center of the lower portion of the front surface of the face guard, respectively.

Implementations according to this aspect can include one or more of the following features and the features described above. For example, the face guard can separate the discharge hole from the suction hole, where the suction hole is defined outside the breathing space, and the discharge hole is defined inside the breathing space. In some implementations, the face guard can further include a coupling portion that faces the rear surface of the rear body and accommodates the plurality of magnetic bodies, a close contact portion configured to contact the face of the user, and a connection portion that connects the coupling portion to the close contact portion, where the connection portion defines a plurality of widths of the face guard in a front-rear direction.

In some examples, the face guard can further include a plurality of protrusions that protrude from an outer surface of the connection portion and extend in the front-rear direction, where the plurality of protrusions are spaced apart from one another in a direction crossing the front-rear direction, and each of lengths of the plurality of protrusions in the front-rear direction defines one of the plurality of the plurality of widths of the face guard.

In some implementations, the face guard can define a plurality of magnetic body mounting portions that protrude from the front surface of the coupling portion and receive the plurality of magnetic bodies, respectively. In some examples, each of the plurality of magnetic body mounting portions can include a mounting portion body that protrudes forward from a front surface of the coupling portion toward one of the plurality of magnets and is inserted into the rear surface of the rear body, where the mounting portion body defines an inner space that is open to the rear surface of the rear body. Each of the plurality of magnetic body mounting portions can further include an insertion guide rib disposed in the inner space of the mounting portion body, where the mounting portion body and the insertion guide rib are spaced apart from each other to thereby define an insertion hole that receives one of the plurality of magnetic bodies between the mounting portion body and the insertion guide rib.

The details of one or more implementations are set forth in the accompanying drawings and the description below. Other features will be apparent from the description and drawings, and from the claims.

DETAILED DESCRIPTION

Reference will now be made in detail to the implementations of the present disclosure, examples of which are illustrated in the accompanying drawings.

Figure 1:
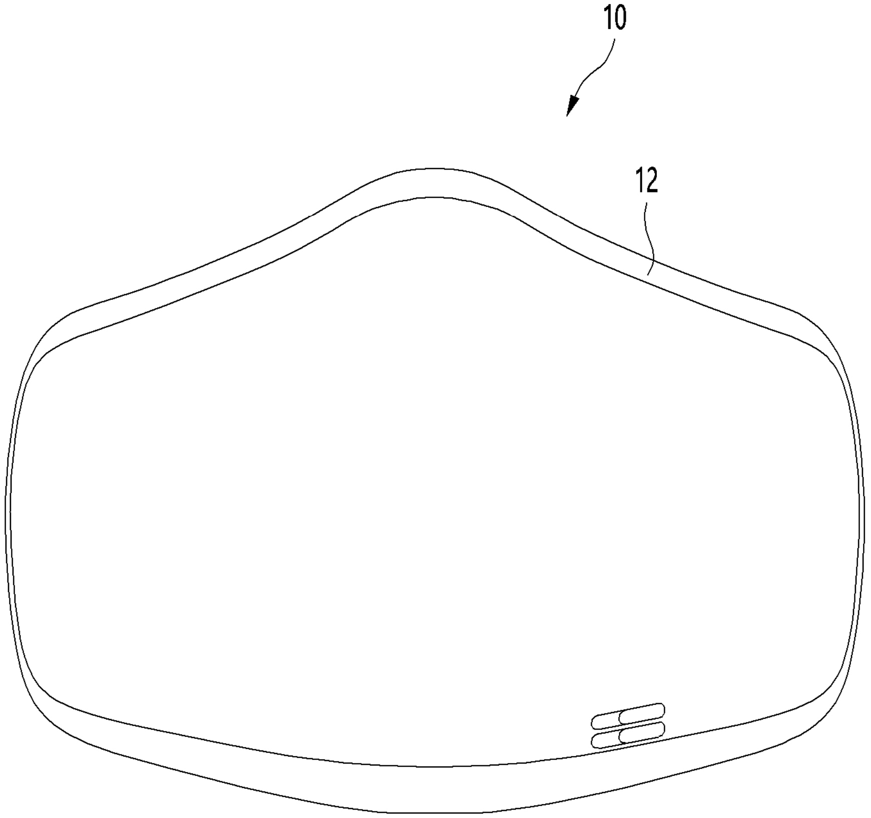
FIG. 1 is a front view of an example of a mask apparatus.
Figure 2:
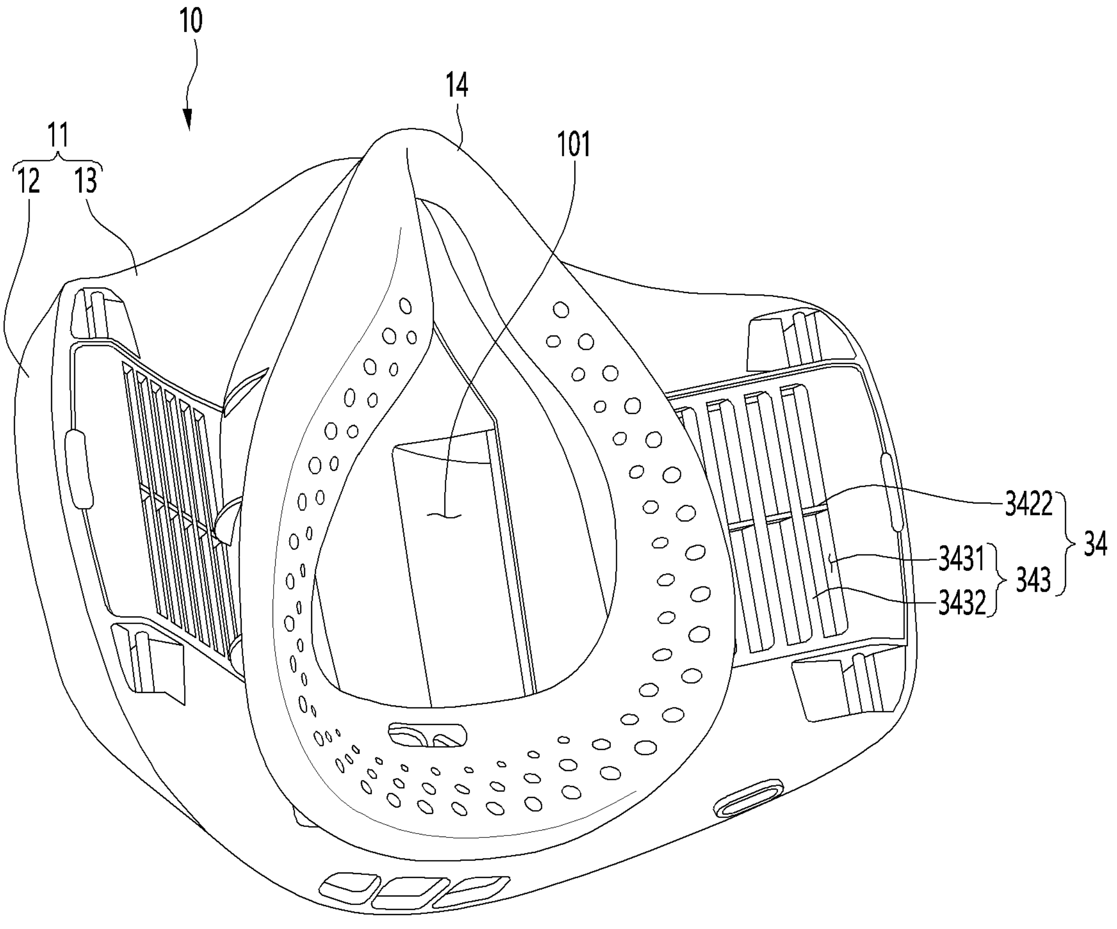
FIG. 2 is a rear perspective view of the mask apparatus.
Figure 3:
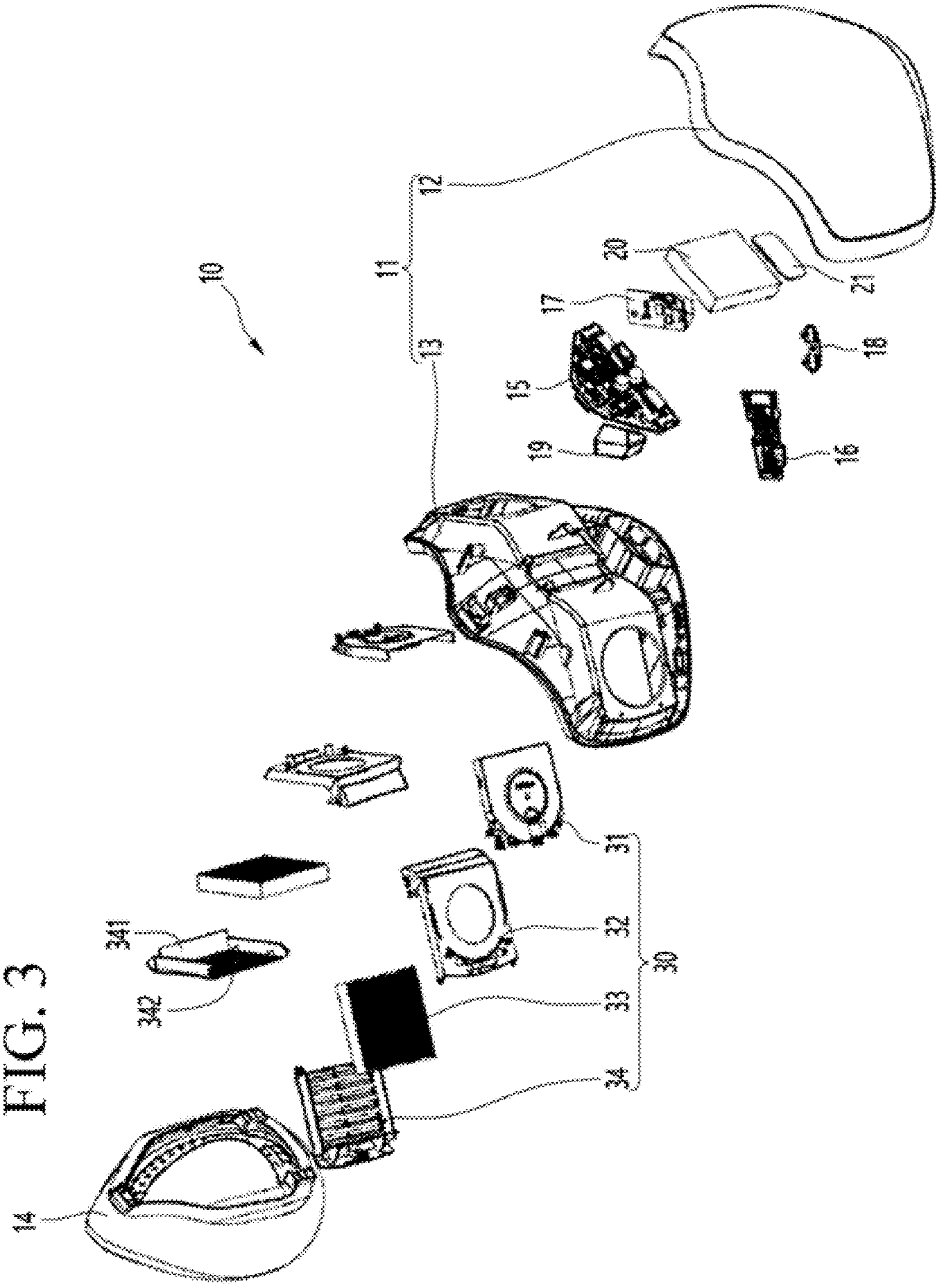
FIG. 3 is an exploded perspective view of the mask apparatus.
Figure 4:
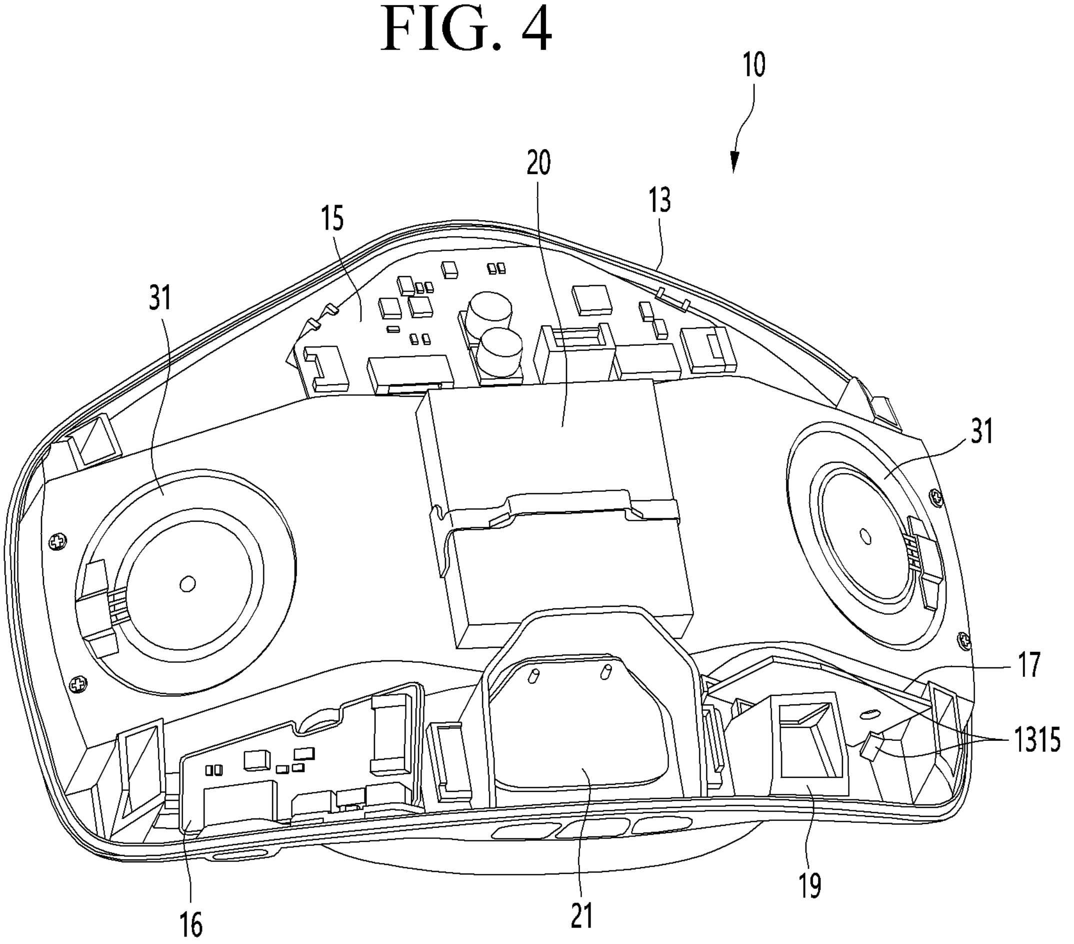
FIG. 4 is a front perspective view of the mask apparatus from which a front body is separated.

FIG. 1 is a front view of an example of a mask apparatus, FIG. 2 is a rear perspective view of the mask apparatus, FIG. 3 is an exploded perspective view of the mask apparatus, and FIG. 4 is a front perspective view of the mask apparatus from which a front body is separated.

In some implementations, referring to FIGS. 1 to 4, a mask apparatus 10 includes a mask body 11, a face guard 14 that is fixedly or detachably coupled to a rear surface of the mask body 11, and an air cleaning module 30 mounted inside the mask body 11.

For example, the mask body 11 includes a front body 12 defining an outer appearance of a front surface and a rear body 13 coupled to a rear surface of the front body 12 to define an outer appearance of a rear surface. The front surface of the front body 12 defines a front surface of the mask apparatus 10, and the rear surface of the rear body 13 faces a face of a user (or a wearer).

In some implementations, the face guard 14 can be coupled to the rear surface of the rear body 13 so as to be in close contact with the user's face and can be made of a silicone or rubber material having elasticity. A breathing space is defined inside the face guard 14, and when the user wears the mask apparatus 10, a user's nose and mouth are accommodated in the breathing space. Thus, external air purified while passing through the air cleaning module 30 is guided to the breathing space and inhales by the user, and air generated when the user exhales is also discharged into the breathing space.

In some implementations, a predetermined space can be defined between the front body 12 and the rear body 13, and as illustrated in FIG. 4, accommodate various electrical components mounted on the front surface of the rear body 13. In addition, the various electrical components are shielded by the front body 12 so as not to be exposed to the outside.

In addition, the air cleaning module 30 includes a fan module 31 placed in an accommodation portion 133 (see FIG. 6) provided in the rear body 13 and a filter 33 placed behind the fan module 31. The fan module 31 includes a centrifugal fan that suctions air in an axial direction to discharge the air in a radial direction.

The air cleaning module 30 further includes a filter housing 34 disposed behind the filter 33, and a suction hole through which external air is suctioned is defined in the filter housing 34. The filter housing 34 can be rotatably coupled to the rear body 13, and the suction hole can be provided in the form of a suction grille 343 as illustrated in the drawings.

In detail, the filter housing 34 includes a filter frame 341 surrounding three side surfaces of the filter 33, and a filter cover 342 disposed on a rear surface of the filter frame 341. The filter cover 342 includes a suction grille 343.

The suction grille 343 can be understood as a structure including a plurality of suction slits 3431 and a plurality of partition ribs 3432 disposed between the adjacent suction slits 3431. The suction grille 343 can be understood as a structure in which one large suction hole is divided into a plurality of narrow and long suction slits 3431 by the plurality of partition ribs 3432. In addition, the plurality of narrow and long suction slits 3431 can be divided into an upper slit and a lower slit by a reinforcing rib 3422. Hereinafter, the suction hole defined in the rear surface of the mask apparatus 10 to suction the external air is defined as including various types of holes including the suction grille 343, and the suction hole of the mask body 11 and the suction grille 343 can be interpreted as the same meaning in some examples.

In addition, a discharge hole 101 is defined at a point spaced apart from the suction hole in a central direction of the rear body 13. The external air suctioned through the suction hole or the suction grille 343 by an operation of the fan module 31 sequentially passes through the filter 33 and the fan module 31 and then is discharged into the breathing space through the discharge hole 101.

For example, the suction hole, i.e., the suction grille 343, can be disposed outside the face guard 14, and the discharge hole 101 can be disposed inside the face guard 14. That is, the suction grille 343 is disposed outside the breathing space, and the discharge hole 101 is defined inside the breathing space, and thus, the suctioned external air and the air exhaled by the user are not mixed with each other.

The air cleaning module 30 further includes a flow guide 32 disposed behind the fan module 31.

In addition, the mask apparatus 10 further includes at least one of a main control module 15, a power module 16, an indicator module 18, a wireless communication module 17, a speaker module 19, and a battery 20, or an exhaust valve 21.

In detail, the main control module 15 is a module for controlling operations of the fan module 31, the speaker module 19, and a pressure sensor and a microphone, which will be described later. The main control module 15 can be disposed on an upper portion of a center of the front surface of the rear body 13.

The power module 16 is a control module for supplying power to the electric components mounted on the mask apparatus 10. The power module 16 can be disposed at a right lower end of the front surface of the rear body 13.

A cable connector, into which a terminal of a cable for power supply and data transmission is inserted, and an LED module used to inform an operation state of the mask apparatus 10 can be mounted on the power module 16. Then, light irradiated from the LED module is diffused and guided through the indicator module 18 and then is emitted to the outside of the mask apparatus 10.

The wireless communication module 17 can be any one of various types of short-range wireless communication modules including Bluetooth. The wireless communication module 17 can be disposed on a left lower end of the front surface of the rear body 13. The wireless communication module 17 can be mounted on the front surface of the rear body 13 in a direction crossing the rear body 13, for example, horizontally. The wireless communication module 17 can be mounted on the front surface of the rear body 13 in a horizontal state by a pair of substrate insertion ribs 1315 protruding from the front surface of the rear body 13. Both side ends of the wireless communication module 17 are supported by the pair of substrate insertion ribs 1315.

The speaker module 19 can be disposed on the left lower end of the front surface of the rear body 13 corresponding to a lower side of the wireless communication module 17.

The battery 20 can be disposed at a center of the front surface of the rear body 13, and the exhaust valve 21 can be disposed to shield an exhaust port provided below the center of the front surface of the rear body 13. That is, when the user exhales, the exhaust valve 21 can open the exhaust port, and when the user inhales, the exhaust valve 21 can block the exhaust port. The exhaust valve 21 can be bent and provided in the form of a flat flap.

Here, the front, rear, left, and right sides of the mask body 11 are defined based on a state in which the user wears the mask apparatus 10.

Figure 5:
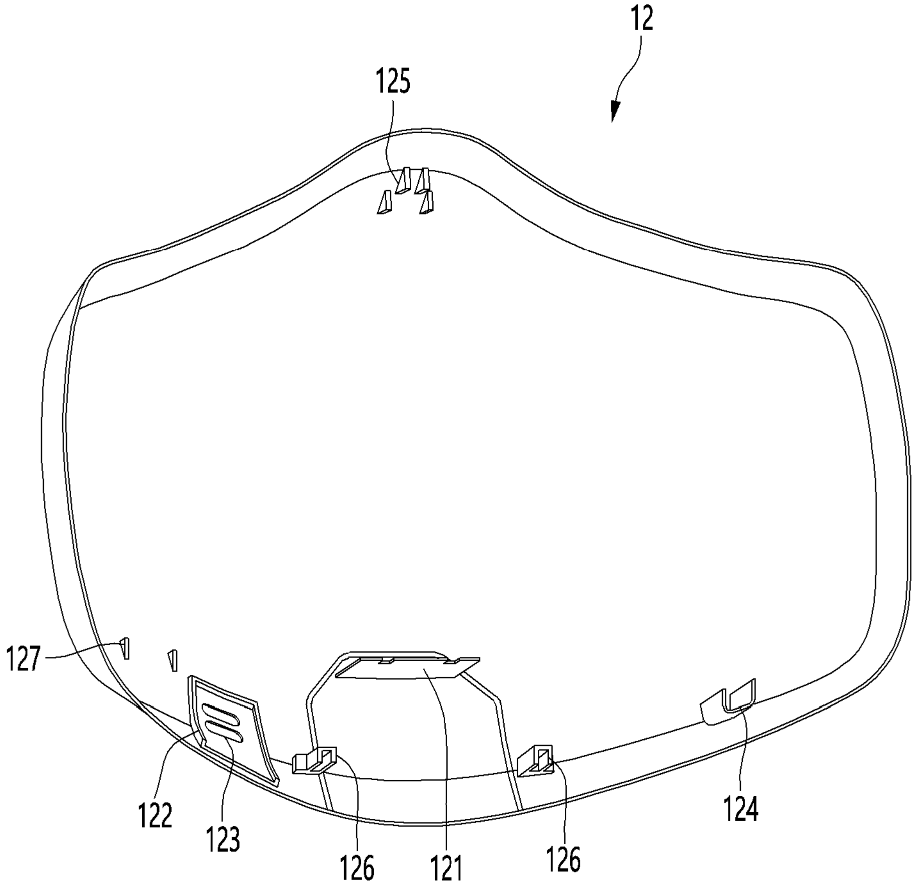
FIG. 5 is a rear perspective view showing an example of a front body of the mask apparatus.

FIG. 5 is a rear perspective view showing an example of the front body of the mask apparatus.

Referring to FIG. 5, the front body 12 of the mask apparatus 10 defines an outer appearance of the front surface of the mask apparatus 10.

When the front surface of the front body 12 is provided as a single body without a separate component mounted thereon, it has the advantage of being clean in outer appearance. When the suction hole is defined at each of the left and right sides of the front body 12, if the suction hole is placed to face an upper side after taking off the mask apparatus 10, there is disadvantage in that possibility, in which foreign substances are introduced into the mask apparatus 10 through the suction hole, is high.

In addition, when a separate cover is installed to shield the suction hole, thereby minimizing the inflow of the foreign substances, a gap may be defined between an edge of the cover and the front surface of the front body 12 so that external air is introduced. That is, there is a restriction that the separate cover has to be coupled to the front surface of the front body 12 in the form that protrudes from the front surface of the front body 12.

As a result, there is a high possibility that the separate cover is damaged by external force or be separated from the front body 12 by being caught by a surrounding obstacle. For this reason, it is advantageous in appearance to design the front body 12 so that the suction hole for inhaling the external air is not defined as much as possible to prevent a separate component from protruding due to additional mounting of the separate component on the front surface of the front body 12, and also it is advantageous for securing durability.

In consideration of this aspect, the suction hole for suctioning the external air is not defined in the front surface of the front body 12 of the present disclosure, and also, additional components including the cover are not mounted at all, and thus, the front surface is designed so that a smooth and continuous single surface is provided. However, a speaker hole 123 is defined in a side of the lower portion so that user's voice is output to the outside.

A plurality of protrusion structures are disposed on the rear surface of the front body 12.

In detail, one or plurality of substrate fixing ribs 125 protrude from an upper end of the center of the rear surface of the front body 12. The one or plurality of substrate fixing ribs 125 can press a front surface of the main control module 15 mounted on the rear body 13 when an edge of the front body 12 is coupled to an edge of the front surface of the rear body 13 to prevent the main control module 15 from being oscillated.

A valve support rib 121 horizontally protrudes from the rear surface of the front body 12. The valve support rib 121 is disposed at a point at which an upper end of the exhaust valve 21 is disposed when the front body 12 is coupled to the rear body 13, to press an upper end of a front surface of the exhaust valve 21. For example, the valve support rib 121 can have a predetermined width and extend backward by a predetermined length at a point spaced a predetermined distance downward from the center of the rear surface of the front body 12.

In addition, a pair of magnet pressing ribs 126 can protrude from the rear surface of the front body 12. In detail, the face guard 14 is mounted on the rear surface of the rear body 13, a magnet is mounted on a front surface of the face guard 14, and a magnet that is attractive to the magnet is mounted on the front surface of the rear body 13. As a result, the face guard 14 is detachably mounted on the rear surface of the rear body 13 by the magnetic force of the magnet.

In some implementations, a pair of lower magnet mounting portions 135 (see FIG. 6) for mounting the magnet are disposed on the front surface of the rear body 13. In addition, the pair of magnet pressing ribs 126 function to press the pair of magnets mounted on the pair of lower magnet mounting portions 135, respectively.

In addition, a substrate pressing rib 127 that is in contact with a front end of a substrate of the wireless communication module 17 protrudes from the rear surface of the front body 12. In detail, when the front body 12 and the rear body 13 are coupled to each other, the substrate pressing rib 127 presses the front end of the substrate of the wireless communication module 17 to prevent the wireless communication module 17 from being oscillated or being separated from the substrate insertion rib 1315.

In addition, a support rib 122 supporting and surrounding an edge of the front end of the speaker module 19 is disposed on the rear surface of the front body corresponding to an edge of the speaker hole 123. The support rib 122 can be surrounded in a shape corresponding to a shape of the front surface of the speaker module 19.

In addition, a substrate fixing rib 124 for pressing a front surface of the power module 16 protrudes from the rear surface of the front body 12. The substrate fixing rib 124 presses a front surface of the substrate of the power module 16 to prevent the power module 16 from oscillated or being separated from the rear body 13.

Figure 6:
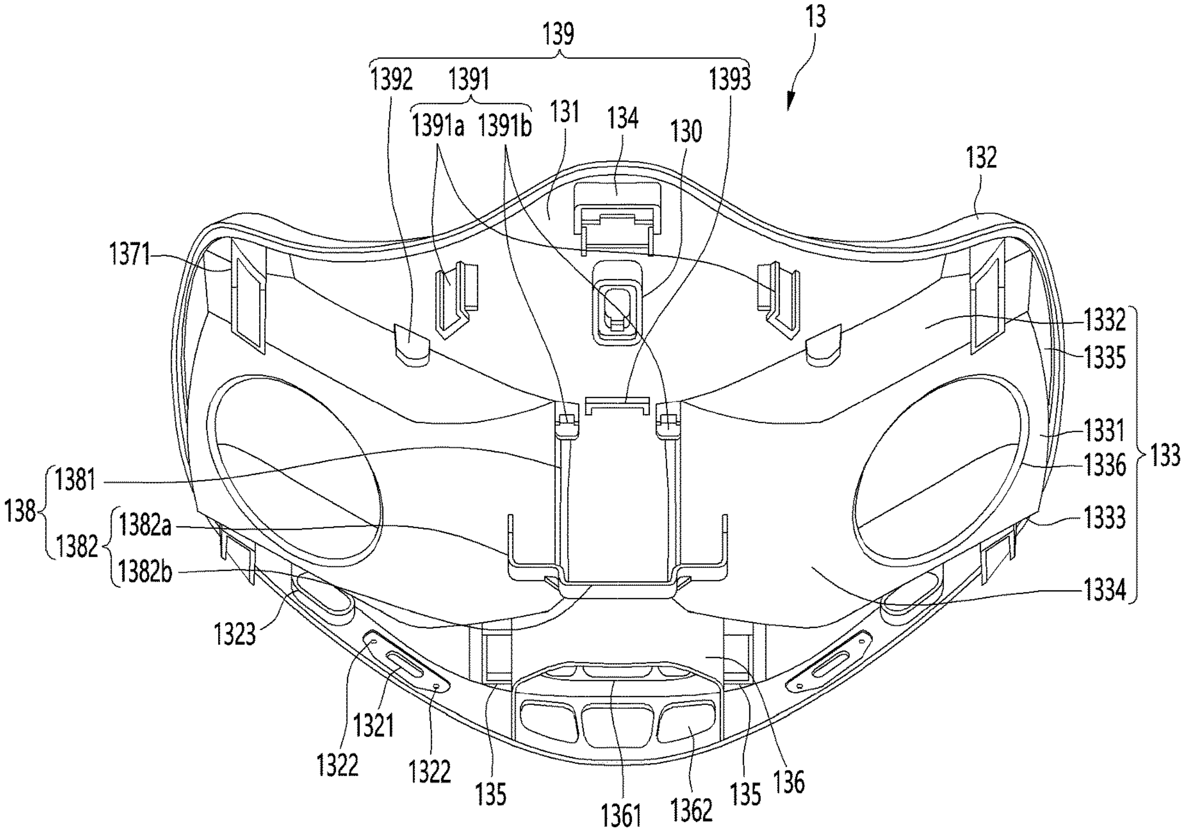
FIG. 6 is a front perspective view showing an example of a rear body of the mask apparatus.
Figure 7:
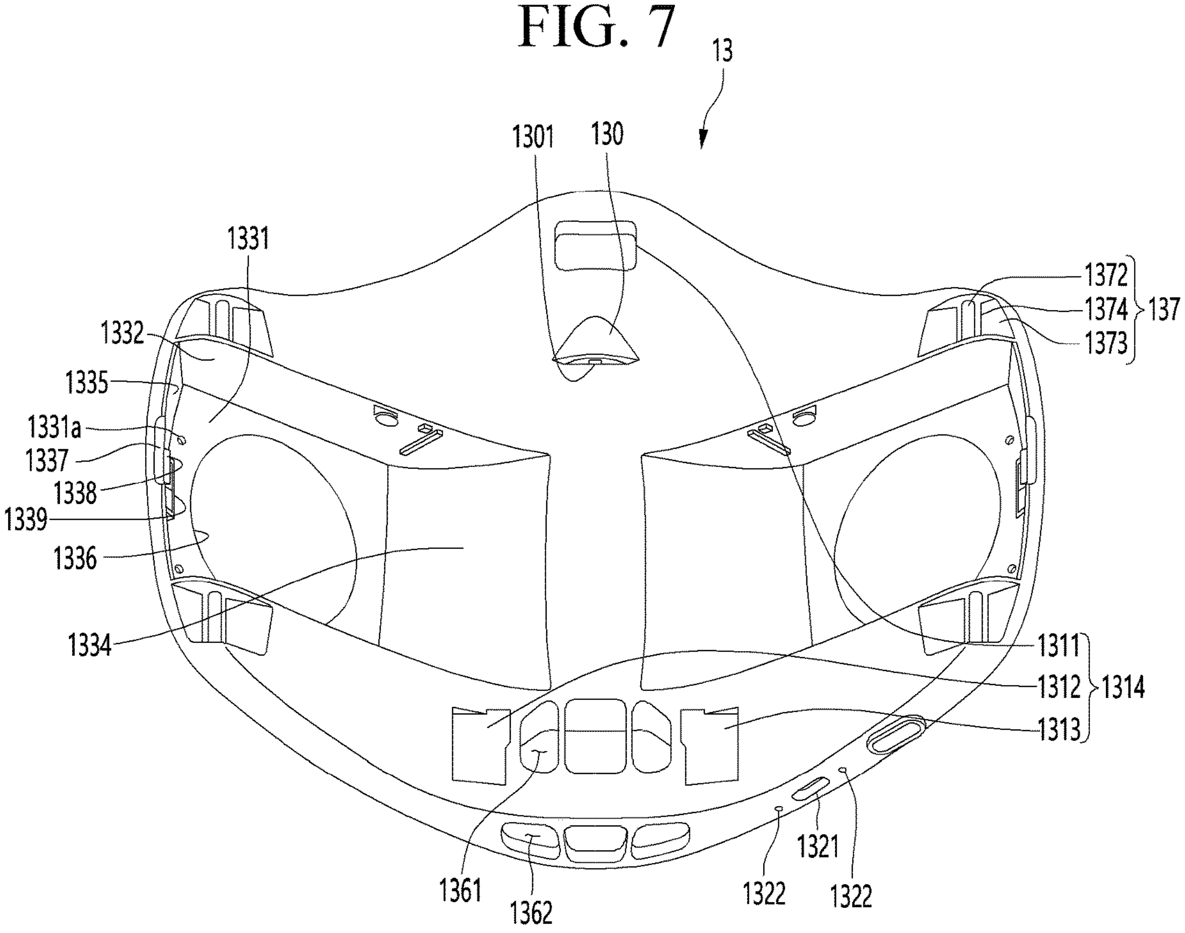
FIG. 7 is a rear perspective view of the rear body.

FIG. 6 is a front perspective view showing an example of the rear body of the mask apparatus, and FIG. 7 is a rear perspective view of the rear body.

Referring to FIGS. 6 and 7, the rear body 13 of the mask apparatus 10 includes a face cover portion 131 that covers a user's face and a fusion portion 132 bent forward from an edge of the face cover portion 131.

In detail, the fusion portion 132 is continuously disposed along an edge of a top surface, edges of both surfaces, and an edge of a bottom surface of the face cover portion 131. In addition, a width of the fusion portion 132 in a front and rear direction, which is bent along an edge of a bottom surface of the face cover portion 131 to extend forward is the largest.

In the fusion portion 132, a portion disposed on the edge of the bottom surface of the face cover portion 131 can be specifically defined as an extension protrusion. The extension protrusion has a convexly rounded shape in such a manner that a width in the front and rear direction gradually increases from both side ends of the rear body 13 toward the center.

In some examples, a bottom exhaust port 1362 can be disposed at a center of the fusion portion 132 defined as the extension protrusion, and a button hole 1321 is defined at a point spaced apart from the bottom exhaust port 1362 toward a side end of the rear body 13. A power button is inserted into the button hole 1321. An indication hole 1322 is defined at a point spaced apart from each of left and right edges of the button hole 1321.

Light irradiated from a light emitting unit mounted on the power module 16 is emitted to the outside through the pair of indication holes 1322. The light emitting unit includes an LED module.

In some examples, the light can be emitted to the outside through any one of the pair of indication holes 1322 when the power of the mask apparatus 10 is turned on. In addition, a remaining amount of battery 20 can be predicted according to a color of the light emitted through the other one of the pair of indication holes 1322.

A terminal insertion hole 1323 is defined at a point further spaced apart from the button hole 1321 toward the side end of the rear body 13. A universal serial bus (USB) cable can be inserted into a terminal connector provided in the power module 16 through the terminal insertion hole 1323. The battery 20 is charged through the USB cable, and a version or function of the mask apparatus 10 can be updated or upgraded by data transmitted through the USB cable.

An accommodation portion 133 for accommodating the air cleaning module 30 is provided in the rear body 13. The accommodation portion 133 is provided at each of left and right sides from the center of the rear body 13, and the pair of accommodation portions 133 are symmetrical with respect to a vertical line passing through the center of the rear body 13.

The accommodation portion 133 protrudes forward from the front surface of the face cover portion 131 to define a space in which the air cleaning module 30 is accommodated. The accommodation portion 133 includes a seating surface 1331 on which the air cleaning module 30, specifically, the fan module 31 is seated, a coupling surface 1335 connecting an outer edge of the seating surface 1331 at a side end of the face cover portion 131, and an air guide surface 1334 connecting the front surface of the face cover portion 131 at an inner edge of the seating surface 1331.

In addition, the accommodation portion 133 further include a top surface 1332 connecting upper ends of the seating surface, the air guide surface 1334, and the coupling surface 1335 to the front surface of the face cover portion 131. In addition, the accommodation portion 133 further include a bottom surface 1333 connecting lower ends of the seating surface, the air guide surface 1334, and the coupling surface 1335 to the front surface of the face cover portion 131.

One or more coupling units, for example, coupling hooks, are disposed on the coupling surface 1335.

A fan mounting hole 1336 can be defined in the seating surface 1331, and the top surface 1332 and the bottom surface 1333 can extend horizontally and extend parallel to each other. In some examples, the suction hole can refer to the fan mounting hole 1336 that is in fluid communication with the suction grille 343.

The coupling surface 1335 can be convexly rounded toward the outside of the rear body 13 and be inclined toward the center of the rear body 13 from the face cover portion 131 to the seating surface 1331.

The air guide surface 1334 can be designed to extend convexly and roundly from the seating surface 1331 toward the face cover portion 131 so that air suctioned by the fan module 31 is smoothly guided toward the discharge hole 101 along the air guide surface 1334.

As another example, the air guide surface 1334 is constituted by a round portion that is rounded with a predetermined curvature at the inner edge of the seating surface 1331 and an inclined portion connecting the face cover portion 131 flatly and obliquely at an end of the round portion.

The accommodation portion 133 includes a left accommodation portion disposed at the left side from the center of the rear body 13 and a right accommodation portion disposed at the right side from the center of the rear body 13. The left accommodation portion and the right accommodation portion are spaced a predetermined distance from the center of the rear body 13, and the battery 20 is mounted in a space between the left accommodation portion and the right accommodation portion.

A battery mounting portion 138 can be disposed on the front surface of the rear body 13. In detail, the battery mounting portion 138 includes a pair of battery seating ribs 1381 and a battery support rib 1382.

The pair of battery seating ribs 1381 protrude forward from the front surface of the face cover portion 131 or an edge of the air guide surface 1334 to extend in parallel in the vertical direction. The pair of battery seating ribs 1381 supports a rear surface of the battery 20.

One end of the battery support rib 1382 extends from either one of the left air guide surface 1334 and the right air guide surface 1334, and the other end is connected to the other side of the left air guide surface 1334 and the right air guide surface 1334.

The battery support rib 1382 has an n-shape to support the front and both surfaces of the battery 20. Thus, a phenomenon in which the battery 20 is separated from the rear body 13 can be prevented by the battery support rib 1382.

In addition, a central portion of the battery support rib 1382 protrudes forward so that a battery having a different size is selectively mounted.

In detail, the battery support rib 1382 includes a pair of extension portions extending forward from the pair of air guide surfaces 1334 and a connection portion extending in a horizontal direction to connect the pair of extension portions to each other.

In addition, a portion of the connection portion is bent to extend forward, so that the battery support rib 1382 is described as being constituted by a first battery support **1382*a* and a second battery support 1382*b*. In detail, the first battery support 1382*a* can be used to support a relatively wide and thin battery, and the second battery support 1382*b*** can be used to support a relatively narrow and thick battery.

The second battery support **1382*b* can be described as being provided by bending a portion of the connection portion of the first battery support 1382*a* forward a plurality of times. Alternatively, it can be described that the relatively small n-shaped second battery support 1382*b* protrudes from a front surface of the relatively large n-shaped first battery support 1382*a***.

An exhaust passage guide 136 protrudes forward from the front surface of the face cover portion 131 corresponding to a lower side of the battery mounting portion 138. In detail, the exhaust passage guide 136 is disposed below the battery mounting portion 138, and a lower end of the battery 20 mounted on the battery mounting portion 138 is supported by a top surface of the exhaust passage guide 136. As a result, it is possible to prevent the battery 20 from being pulled downward due to gravity while being inserted into the battery mounting portion 138.

The exhaust passage guide 136 can have a substantially tunnel-shaped longitudinal cross-section, and a front exhaust port 1361 can be disposed on the face cover portion 131 corresponding to the inside of the exhaust passage guide 136.

At least one of the front exhaust port 1361 or the bottom exhaust port 1362 can be provided in the form of an exhaust grille divided into a plurality of small exhaust ports by a plurality of grills or partition ribs. In addition, the front exhaust port 1361 is selectively opened and closed by the exhaust valve 21.

An upper magnet mounting portion 134 is disposed at the upper end of the center of the front surface of the face cover portion 131, and a pair of lower magnet mounting portions 135 are disposed on a lower end of the front surface of the face cover portion 131.

In detail, the lower magnet mounting portion 135 is disposed on each of a left edge and a right edge of the exhaust passage guide 136. The magnet mounted on the lower magnet mounting portion 135 is pressed by the pair of magnet pressing ribs 126 (see FIG. 5) protruding from the rear surface of the front body 12.

A strap connection portion 137 is disposed at each of the left end and the right end of the rear body 13. In detail, the strap connection portion 137 is a portion to which an end of a strap or band that is caught on the user's ear or wraps around the back of the user's head is connected. The strap connection portion 137 is disposed at each of upper and lower portions of the left and right ends of the rear body 13.

Both ends of any one of the pair of straps can be respectively connected to the strap connection portions 137 provided at the upper left and lower ends, and both ends of the other one can be respectively connected to the strap connection portions 137 provided at the upper right and lower ends. Then, the pair of straps can be hung on both user's ears, respectively.

As another method, both ends of any one of the pair of straps can be respectively connected to the strap connection portions 137 provided at the upper left and right ends, and both ends of the other one can be respectively connected to the strap connection portions 137 provided at the lower left and right ends. Then, the pair of straps can be wrapped around the user's back of the head.

Each of the four strap connection portions 137 includes a strap groove 1373 that is recessed from the front surface of the rear body 13 to extend in the horizontal direction (width direction of the rear body), a strap hole 1374 defined in any point of the strap groove 1373, a strap bar 1372 connecting top and bottom surfaces of the strap groove 1373 to each other, and a tubular waterproof rib 1371 extending from the rear surface of the rear body 13 corresponding to an edge of the strap hole 1374.

A main control module mounting portion 139 is disposed on the front surface of the rear body 13.

In detail, the main control module mounting portion 139 includes a substrate fixing hook 1391 protruding forward from the front surface of the face cover portion 131 and a substrate seating rib 1393 and substrate support rib 1392, which support a rear surface of the main control module 15.

In detail, the substrate fixing hook 1391 can include a pair of first substrate fixing hooks 1391*a* disposed above the accommodation portion 133 and a pair of second substrate fixing hooks 1391*b* disposed between the pair of accommodation portions 133 facing each other.

The pair of first substrate fixing hooks 1391*a* can be disposed at a point spaced upward from a top surface of the left accommodation portion and at a point spaced upward from a top surface of the right accommodation portion. The pair of first substrate fixing hooks 1391*a* function to fix left and right ends of the main control module 15.

In addition, the pair of second substrate fixing hooks 1391*b* can be respectively disposed at points corresponding to inner upper ends of the pair of accommodation portions 133. In detail, any one of the pair of second substrate fixing hooks 1391*b* can be disposed at a point at which an upper edge of the right accommodation portion meets the front surface of the face cover portion 131. In addition, the other of the pair of second substrate fixing hooks 1391*b* can be disposed at a point at which an upper edge of the left accommodation portion meets the front surface of the face cover portion 131.

The pair of second substrate fixing hooks 1391*b* function to fix a lower end of the control substrate of the main control module 15.

In addition, the substrate support rib 1392 can protrude from the front surface of the face cover portion 131 corresponding between the pair of second substrate fixing hooks 1391*b* to support a rear surface of the lower end of the control substrate of the main control module 15.

In addition, a rear surface of the upper end of the main control module 15 can be supported by a front end of the upper magnet mounting portion 134. The main control module 15 is disposed to be spaced apart from the face cover portion 131 by the upper magnet mounting portion 134 and the substrate seating rib 1393, and thus, there is an effect that the main control module 15 is stably coupled to the rear body without oscillated by the substrate fixing hook 1391.

A pressure sensor mounting portion (or breathing sensor mounting portion) 130 can be disposed at a center of the upper portion of the front surface of the face cover portion 131. A pressure sensor (to be described later) mounted on the pressure sensor mounting portion 130 senses a pressure in the breathing space defined inside the face guard 14. That is, it can be determined whether the user is currently inhaling or exhaling according to a change in pressure inside the breathing space. The pressure sensor can be defined as a breathing sensor, and although the terms are different, it should be understood as a sensor performing the same function.

The pressure sensor mounting portion 130 is provided on the front surface of the rear body 13, and when the main control module 15 is mounted on the main control module mounting portion 139, the pressure sensor mounting portion 130 is disposed at a point at which the pressure sensor (or breathing sensor) mounted on the rear surface of the main control module 15 is disposed. Thus, when the main control module 15 is mounted to the main control module mounting portion 139, the pressure sensor is accommodated in the pressure sensor mounting portion 130. In addition, a front end of the pressure sensor mounting portion 130 is in close contact with the rear surface of the control substrate of the main control module 15.

In addition, a portion defining a bottom of the pressure sensor mounting portion 130 protrudes to a rear side of the rear body 13, and a through-hole 1301 is defined in a bottom surface of the portion protruding backward. The breathing space defined by the rear surface of the rear body 13 and the face guard 14 and an inner space of the pressure sensor mounting portion 130 communicate with each other through the through-hole 1301. As a result, a portion of air generated when the user exhales flows into the inner space of the pressure sensor mounting portion 130 through the through-hole 1301. In addition, the pressure sensor accommodated in the pressure sensor mounting portion 130 senses a pressure inside the pressure sensor mounting portion 130. Then, the sensed pressure value is transmitted to a microcomputer (to be described later) of the main control module 15 so that a user's breathing state is determined.

A magnet mounting groove 1314 is defined each of the rear surface of the rear body 13 corresponding to a direct rear surface of the upper magnet mounting portion 134 and the rear surface of the rear body 13 corresponding to a direct rear surface of the pair of lower magnet mounting portions 135.

The magnet mounting groove 1314 includes a first magnet mounting groove 1311 defined in a direct rear surface of the upper magnet mounting portion 134 and a second magnet mounting groove 1312 and a third magnet mounting groove 1313, which are defined in a direct rear surface of the lower magnet mounting portion 135.

Three magnets mounted on the face guard 14 are attached to the first to third magnet mounting grooves 1311 to 1313 by magnetic force, respectively. In addition, when the user pulls the face guard 14 with force greater than the magnetic force, the face guard 14 is easily separated from the rear body 13.

As described above, the fan mounting hole 1336 can be defined in the seating surface 1331 of the accommodation portion 133. In addition, one or plurality of flow guide coupling holes 1331*a* are defined at a point spaced apart from the fan mounting hole 1336 toward the outer edge of the seating surface 1331. The flow guide 32 is fixed to the accommodation portion 133 by a coupling member passing through the flow guide coupling hole 1331*a*.

In addition, a flow guide hook 1339 and a filter hook 1338 are disposed to be spaced apart from each other in the front and rear direction on the coupling surface 1335 of the accommodation portion 133. The flow guide hook 1339 is disposed closer to the seating surface 1331 than the filter hook 1338.

In addition, a gripping groove 1337 is defined at a side end of the rear surface of the rear body 13 corresponding to a rear side of the filter hook 1338. In detail, it can be described that the gripping groove 1337 is defined at a point at which the fusion portion 132 and the coupling surface 1335 meet each other.

Figure 8:
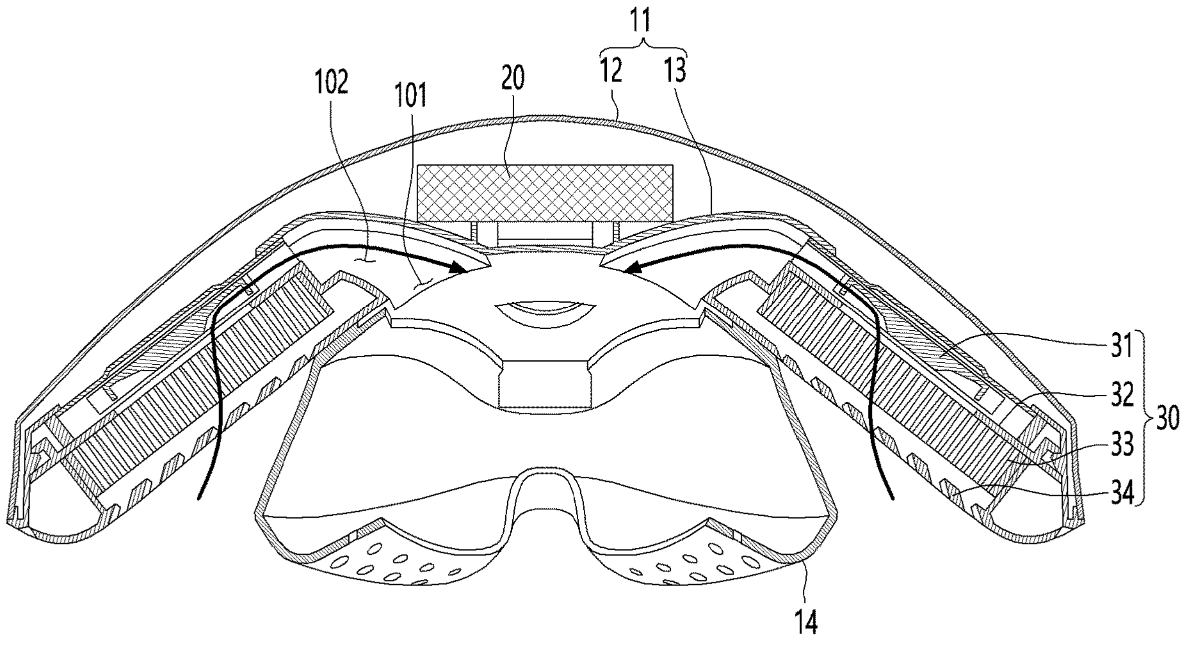
FIG. 8 is a transverse cross-sectional view of the mask apparatus.
Figure 9:
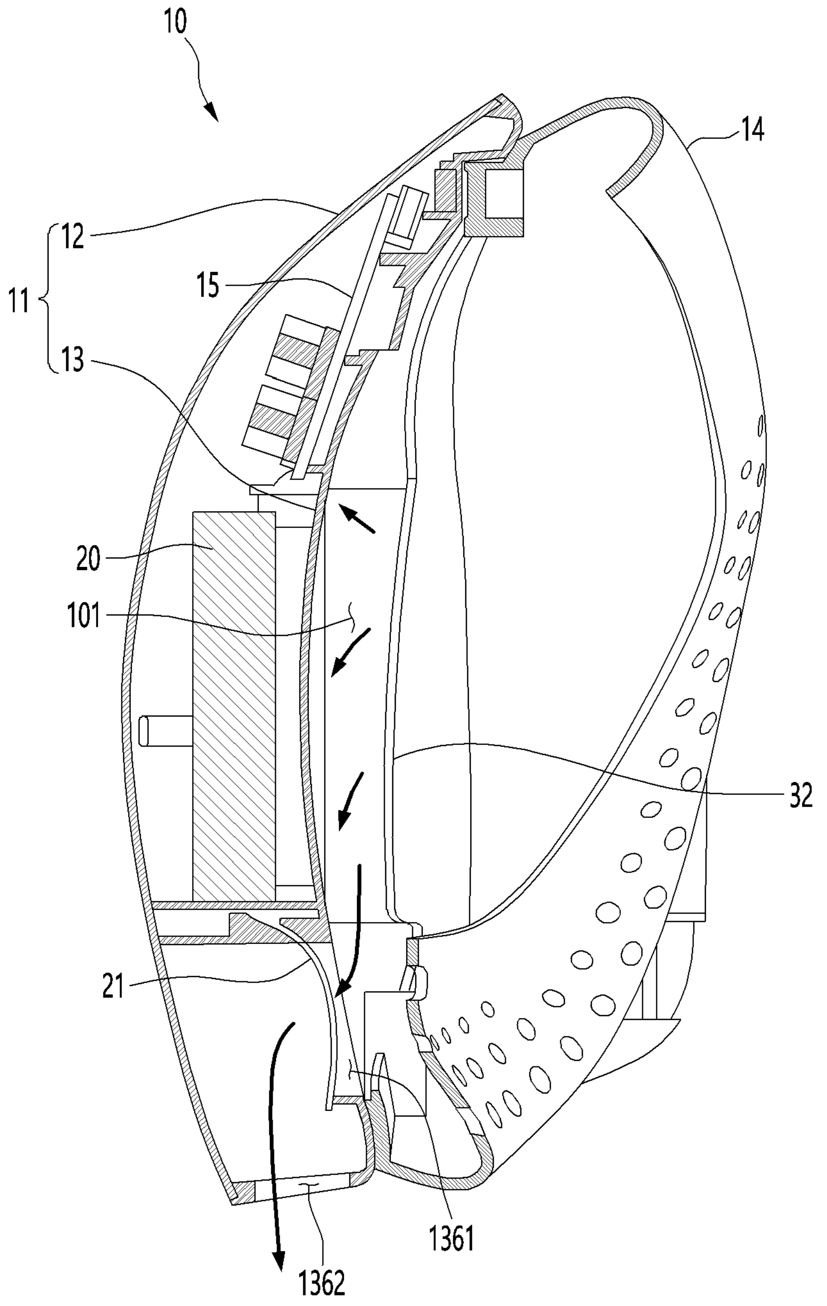
FIG. 9 is a longitudinal cross-sectional view of the mask apparatus.

FIG. 8 is a transverse cross-sectional view of the mask apparatus, and FIG. 9 is a longitudinal cross-sectional view of the mask apparatus.

Referring to FIGS. 8 and 9, when the user operates the fan module 31 by pressing the power button, external air is introduced into the mask apparatus 10 through the suction grills 343 (or suction holes) disposed at the left and right sides of the rear surface of the mask apparatus 10.

The external air introduced through the suction grille 343 is purified while passing through the filter 33. Then, the air passing through the filter 33 is suctioned in an axial direction of the fan module 31 and then discharged in a radial direction.

As illustrated in FIG. 8, a front surface of the fan module 31 is seated on the seating surface 1331, and a rear surface of the fan module 31 is opened. In addition, the opened rear surface of the fan module 31 is shielded by the flow guide 32, and a communication hole serving as a suction hole of the fan module 31 is defined in the flow guide 32. The air passing through the filter 33 is introduced into the fan through the communication hole.

In some examples, an air duct 102 is defined between a side surface of the flow guide 32 and the air guide surface 1334. In addition, an inlet of the air duct 102 communicates with an outlet (or discharge hole) of the fan module 31, and the outlet of the air duct 102 communicates with the discharge hole 101.

In addition, the discharge hole 101 is defined in the breathing space defined by the rear surface of the face guard 14 and the rear body 13. Therefore, the external air suctioned by the fan module 31 is discharged to the breathing space, so that the user inhales.

In addition, the air guide surface 1334 is provided to be smoothly rounded from the outlet of the fan module 31 toward the discharge hole 101, so that the air discharged in the radial direction of the fan module 31 is not sharply changed in flow direction while flowing toward the discharge hole 101.

In detail, in the case of the centrifugal fan, the discharge of the air in the axial suction and radial discharge are due to a shape of a cone or truncated cone hub. That is, the air suctioned in the axial direction of the centrifugal fan is smoothly changed in direction to 90 degrees along the round surface of the hub.

Here, since the rounded direction of the hub of the fan module 31 and the rounded direction of the air guide surface 1334 are the same, the air suctioned into the fan module 31 smoothly flows in only one direction.

If the suction grille 343 is provided on the front body 12, the suction hole of the fan module 31 faces the front body 12, and as a result, the rounded direction of the hub of the fan module is opposite to the rounded direction of the air guide surface 1334. As a result, the air discharged from the fan module 31 collides with the beginning of the air guide surface 1334 corresponding to the suction hole of the air duct 102 to generate flow resistance and flow noise.

That is, the air suctioned in the axial direction of the fan module 31 can substantially generate an S-shaped flow, resulting in a greater flow loss than the structure, in which the C-shaped or n-shaped flow is generated.

When the user exhales, the air discharged through the user's mouth and nose is collected in the breathing space. A minute portion of the air collected in the breathing space is introduced into the pressure sensor mounting portion 130 through the through-hole 1301.

In addition, most of the air collected in the breathing space descends and is discharged to the outside through the front exhaust port 1361 and the bottom exhaust port 1362. Here, as the exhaust valve 21 is bent forward by the pressure of air generated when the user exhales, the front exhaust port 1361 is opened. In addition, when the user inhales, the pressure inside the breathing space is lower than atmospheric pressure, and the exhaust valve 21 returns to its original position to shield the front exhaust port 1361.

Figure 10:
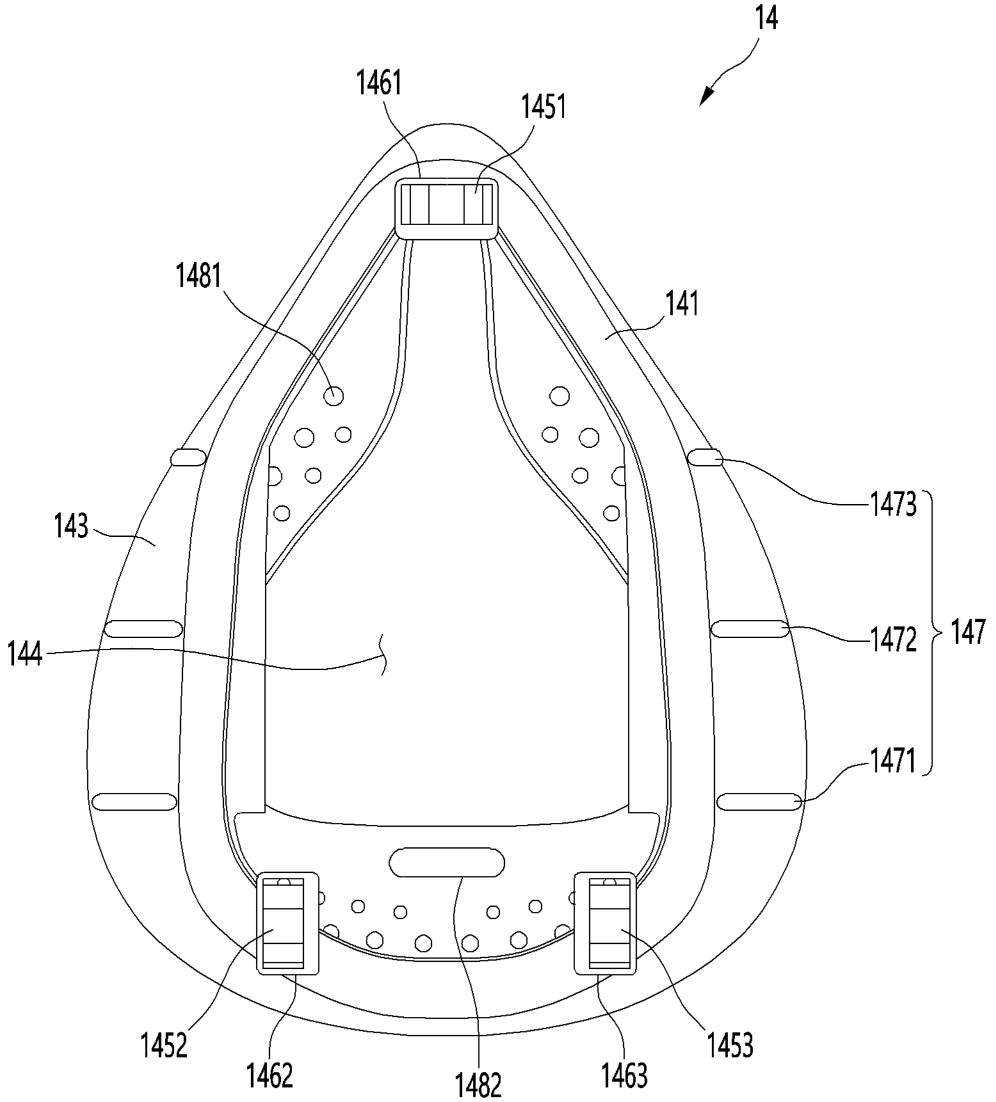
FIG. 10 is a front view showing an example of a face guard.
Figure 11:
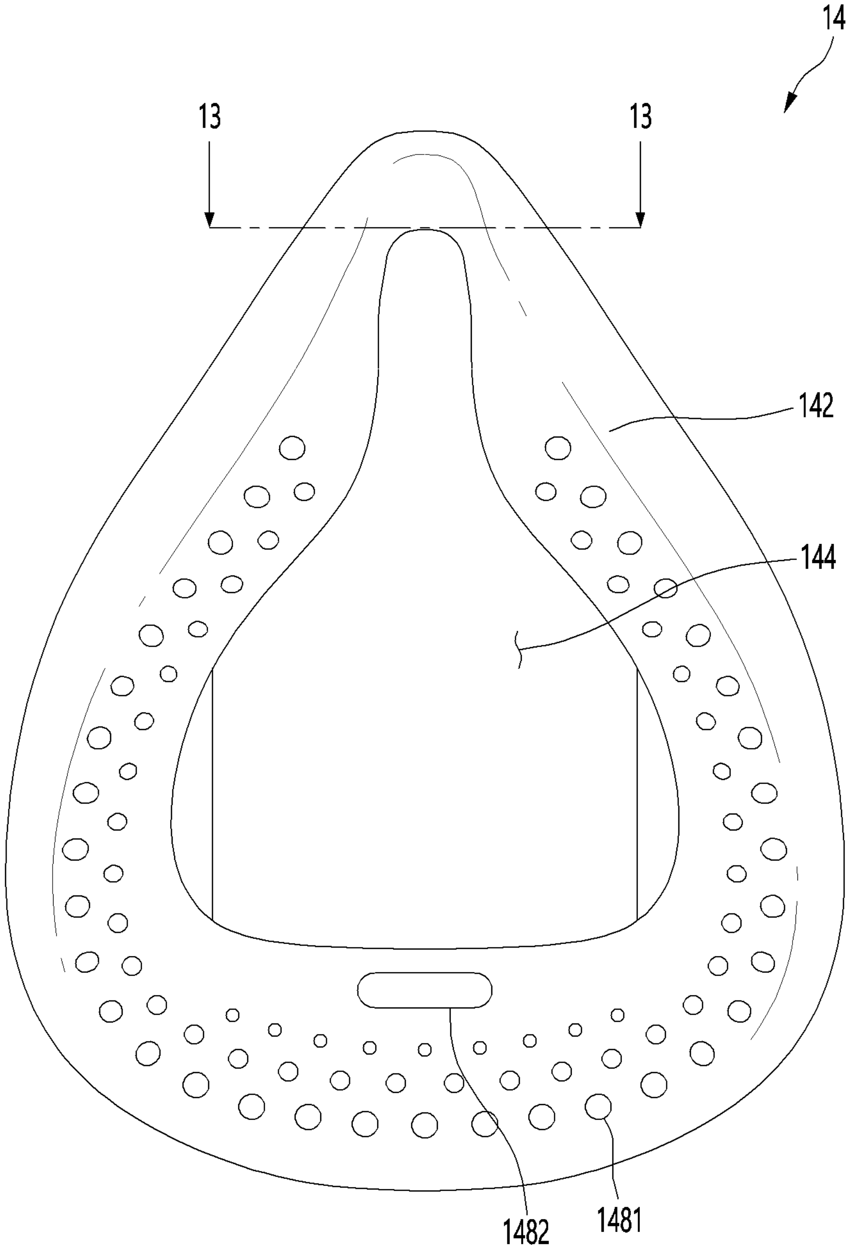
FIG. 11 is a rear view of the face guard.
Figure 12:
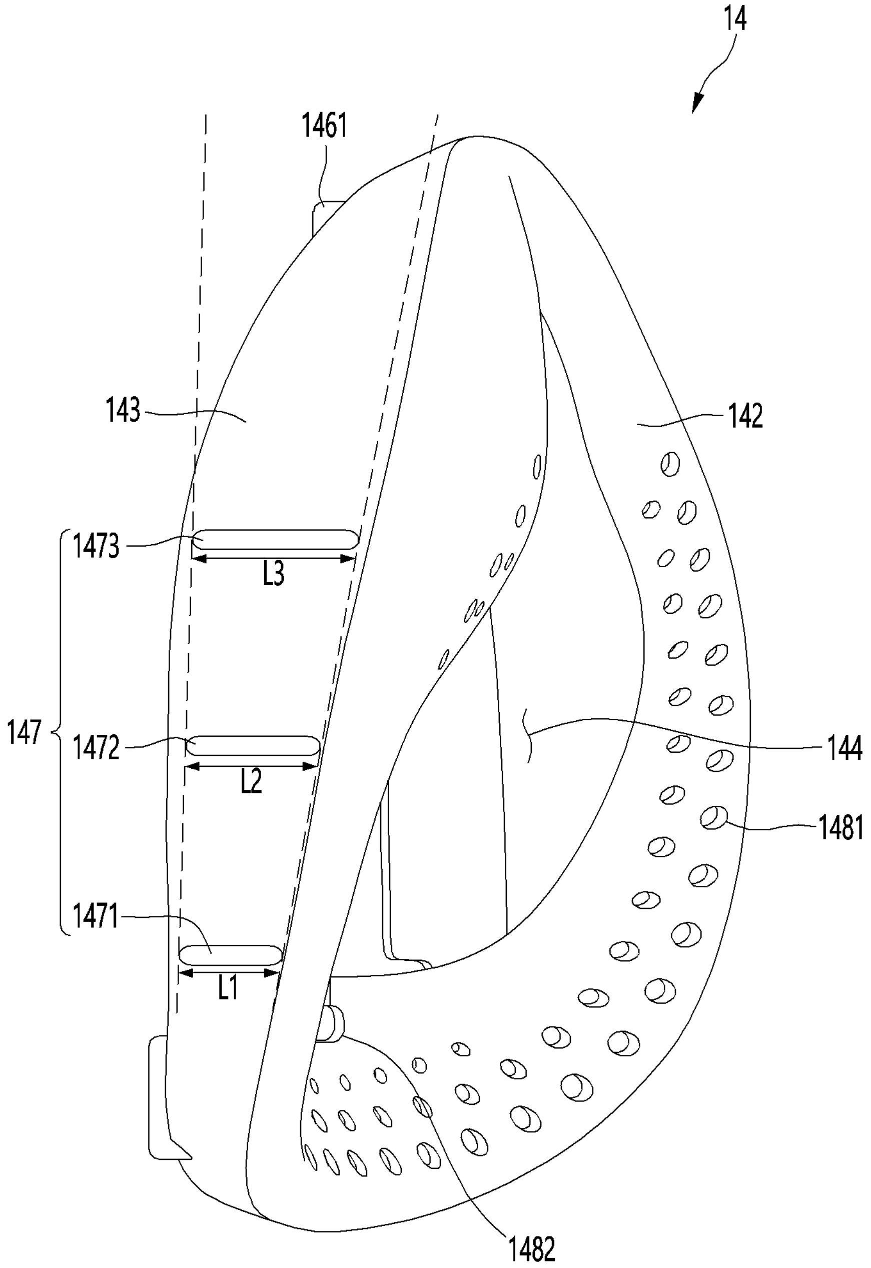
FIG. 12 is a side view of the face guard.
Figure 13:
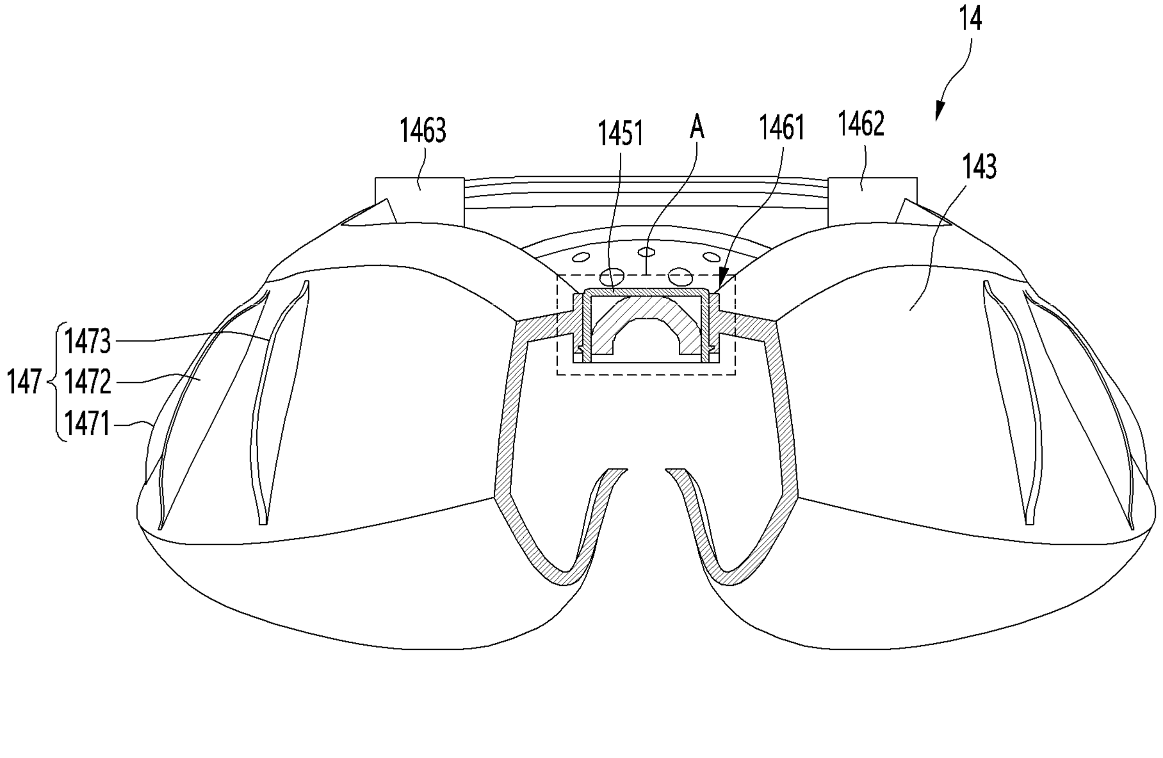
FIG. 13 is a partial cross-sectional view of the face guard, taken along line 13-13 of FIG. 11.

FIG. 10 is a front view of the face guard, FIG. 11 is a rear view of the face guard, FIG. 12 is a side view of the face guard, and FIG. 13 is a partial cross-sectional view of the face guard, taken along line 13-13 of FIG. 11.

Referring to FIGS. 10 to 13, the face guard 14 of the mask apparatus 10 can be fixedly or detachably coupled to the rear surface of the mask body 11 and be in close contact with and the user's face.

That is, a front surface of the face guard 14 can be in close contact with the rear surface of the rear body 13, and a rear surface of the face guard 14 can be in close contact with the user's face.

The face guard 14 can have a predetermined thickness and can be provided in a water droplet shape or a donut shape with an empty center. The face guard 14 can has a central portion passing from the front surface to the rear surface to provide an accommodation space 144 inside which the user's nose or mouth is accommodated.

The face guard 14 can be provided in a shape in which a width in the left and right direction becomes slim upward from a lower portion thereof. The accommodation space 144 is also defined to become narrower in width upward from a lower portion thereof. Thus, the user's mouth can be accommodated in a lower space of the accommodation space 144, and the user's nose can be accommodated in an upper space of the accommodation space 144. When the user wears the mask apparatus 10, the user's nose can be fixed to the upper portion of the face guard 14 and be in close contact with the upper portion of the face guard 14.

The face guard 14 can be made of a silicone or rubber material having elasticity and can be in close contact with the user's face to define the breathing space inside the face guard 14.

In detail, the face guard 14 can include a coupling portion 141 facing the rear surface of the rear body 13, a close contact portion 142 that is in close contact with the user's face, and a connection portion 143 connecting the coupling portion 141 to the close contact portion 142 and having a predetermined width in the front and rear direction. The coupling portion 141, the close contact portion 142, and the connection portion 143 can be integrated with each other.

In some examples, the face guard 14 can be described as including a front surface that is in close contact with the rear surface of the rear body 13, a rear surface that is in close contact with the user's face, and a side surface connecting the front surface to the rear surface and having a predetermined width in the front and rear direction.

The coupling portion 141 can be provided to be surrounded with a predetermined width along an edge of a front end of the face guard 14. The coupling portion 141 can be provided in a ring shape having a closed loop.

The coupling portion 141 is provided with a magnetic body mounting portion 146 on which a magnetic body that is attractive to a magnet mounted on the front surface of the rear body 13 is mounted.

The magnetic body mounting portion 146 can protrude forward from the coupling portion 141, and the magnetic body 145 can be inserted and mounted therein. The magnetic body mounting portion 146 can be provided in plurality.

In detail, the magnetic body mounting portion 146 includes a first magnetic body mounting portion 1461 disposed above the coupling portion 141 and second and third magnetic body mounting portions 1462 and 1463 disposed below the coupling portion 141 and spaced apart from each other in a lateral direction.

In this case, the first magnetic body mounting portion 1461, the second magnetic body mounting portion 1462, and the third magnetic body mounting portion 1463 can have the same shape.

In some implementations, the first magnetic body mounting portion 1461 can be arranged to be elongated in the horizontal direction, and the second magnetic body mounting portion 1462 and the third magnetic body mounting portion 1463 can be arranged to be elongated in the vertical direction. That is, since the first to third magnetic body mounting portions 1461 to 1463 have the same shape or structure, the first magnetic body mounting portion 1461 will be representatively described below.

The first magnetic body mounting portion 1461 is disposed at a center of the upper end of the coupling portion 141, and the second magnetic body mounting portion 1462 and the third magnetic body mounting portion 1463 are disposed at points spaced apart from a center of the lower end of the coupling portion 141 in the lateral direction, respectively.

In addition, a first magnetic body 1451 is mounted inside the first magnetic body mounting portion 1461, a second magnetic body 1452 is mounted inside the second magnetic body mounting portion 1462, and a third magnetic body 1453 is mounted inside the third magnetic body mounting portion 1463.

According to this configuration, the face guard 14 can be easily fixed to the rear surface of the rear body 13 by only allowing the first to third magnetic bodies 1451 to 1453 to approach the first to third magnet mounting grooves 1311 to 1313.

In some implementations, one magnetic body 1451 exists above the face guard 14, and two magnetic bodies 1452 and 1453 exist below the face guard 14. Thus, the magnetic body 1451 disposed above the face guard 14 can be coupled first to the first magnet mounting groove 1311 so that the positions of the remaining two magnetic bodies 1452 and 1453 are smoothly induced to the positions of the second and third magnet mounting grooves 1312 and 1313.

Therefore, in some examples, the face guard 14 can be mounted to the rear body without aligning all of the three magnetic bodies 1451, 1452, and 1453 with the three magnet mounting grooves 1311, 1312, and 1313, respectively, and there may be no defective coupling.

In addition, when the user pulls the face guard 14 with force greater than the magnetic force in the state in which the three magnetic bodies 1451, 1452, and 1453 are attached by the magnetic force, the face guard 14 can be easily separated from the rear body 13.

A spacing protrusion 147 protruding from an outer surface of the face guard 14 to maintain the state in which at least a portion of the connection portion 143 is spaced apart from the filter cover 342.

The spacing protrusion 147 can be provided in one or plurality from an outer surface of the connection portion 143. The spacing protrusion 147 can be convex or rounded. The spacing protrusion 147 can be disposed in a region of the filter cover 342.

In addition, the spacing protrusion 147 can be disposed to be elongated in the front and rear direction on the outer surface of the connection portion 143. The spacing protrusion 147 can be provided to have a length corresponding to a length of a width (front and rear direction) of the connection portion 143 in which the spacing protrusion 147 is disposed.

The spacing protrusion 147 can be provided in plurality to be spaced apart from each other. A plurality of spacing protrusions 147 can be disposed at left and right surfaces of the connection portion 143, respectively. The plurality of spacing protrusions 147 can be symmetrically disposed on the basis of a vertical line passing through a center of the face guard 14.

In detail, the spacing protrusion 147 can include a first protrusion 1471 disposed at a lower point of the left surface of the connection portion 143, a second protrusion 1472 disposed at an upper side of the first protrusion 1471, and a third protrusion 1473 disposed above the second protrusion 1472.

The first to third protrusions 1471 to 1473 can be disposed to be spaced apart from each other in the vertical direction.

The first to third protrusions 1471 to 1473 can be horizontally disposed with each other.

In some examples, the first to third protrusions 1471 to 1473 can extend to be elongated in the front and rear direction on the side surface of the connection portion 143. Here, the first to third protrusions 1471 to 1473 can be provided to have lengths (e.g., L1, L2, L3) corresponding to widths (front and rear direction) of the connection portion 143.

As illustrated in FIG. 12, the connection portion 143 can be provided in a shape of which the width in the front and rear direction increases upward from the lower portion, and thus, the third protrusion 1473 disposed above the connection portion 143 can be provided to be longer than the first protrusion 1471 disposed under the connection portion 143.

In some examples, the first to third protrusions 1471 to 1473 can be disposed in a region of the filter cover 342. This is to prevent a portion of the face guard 14 from covering the suction hole, that is, the suction grille 343 while the face guard 14 is pressed when the user wears the mask apparatus 10.

That is, even when the face guard 14 is pressed by external force, the first to third protrusions 1471 to 1473 can be maintained in the state in which the face guard 14 is spaced apart from the filter cover 342.

In some implementations, the first protrusion 1471 can be disposed at a point corresponding to a lower end of the filter cover 342, the second protrusion 1472 can be disposed at a point corresponding to a central portion of the filter cover 342, and the third protrusion 1473 can be disposed at a point corresponding to an upper end of the filter cover 342.

Through-holes 1481 and 1482 for ventilation can be defined in a portion the face guard 14, which is in close contact with the user's face. A plurality of the through-holes 1481 and 1482 can be defined along an edge of the close contact portion 142. Each of the through-holes 1481 and 1482 can have a circular or non-circular cross-section.

When the user wears the mask apparatus 10, the close contact portion 142 of the face guard 14 is fixed to be in close contact with the user's face. In this case, when the mask apparatus 10 is worn for a long time, sweat or contaminants can be accumulated on the user's face. Therefore, the plurality of through-holes 1481 and 1482 can be defined in the close contact portion 142 of the face guard 14 to ventilate the user's face.

Hereinafter, a structure in which the face guard is coupled to the rear body will be described in detail with reference to the drawings.

Figure 14:
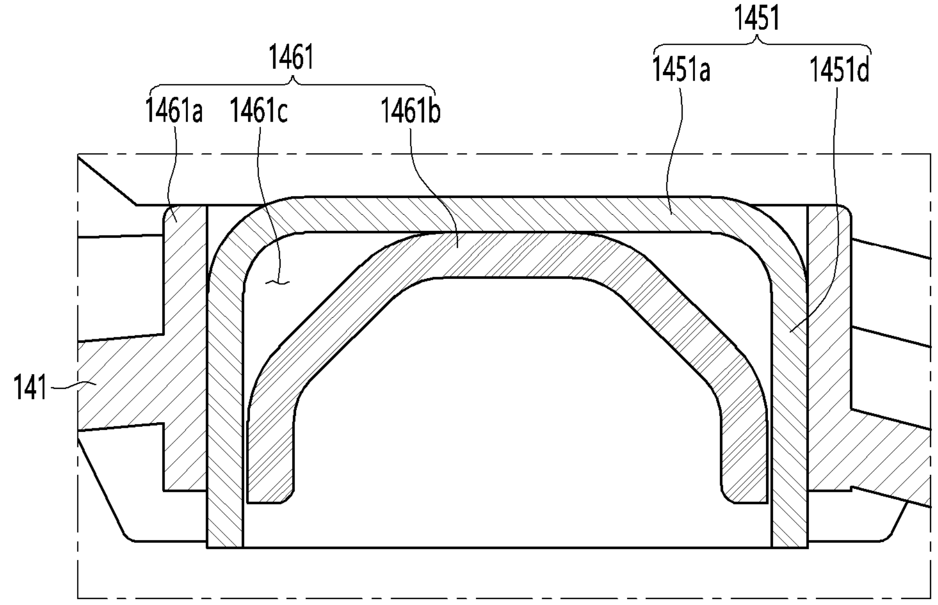
FIG. 14 is an enlarged view of a portion "A" of FIG. 13.
Figure 15:
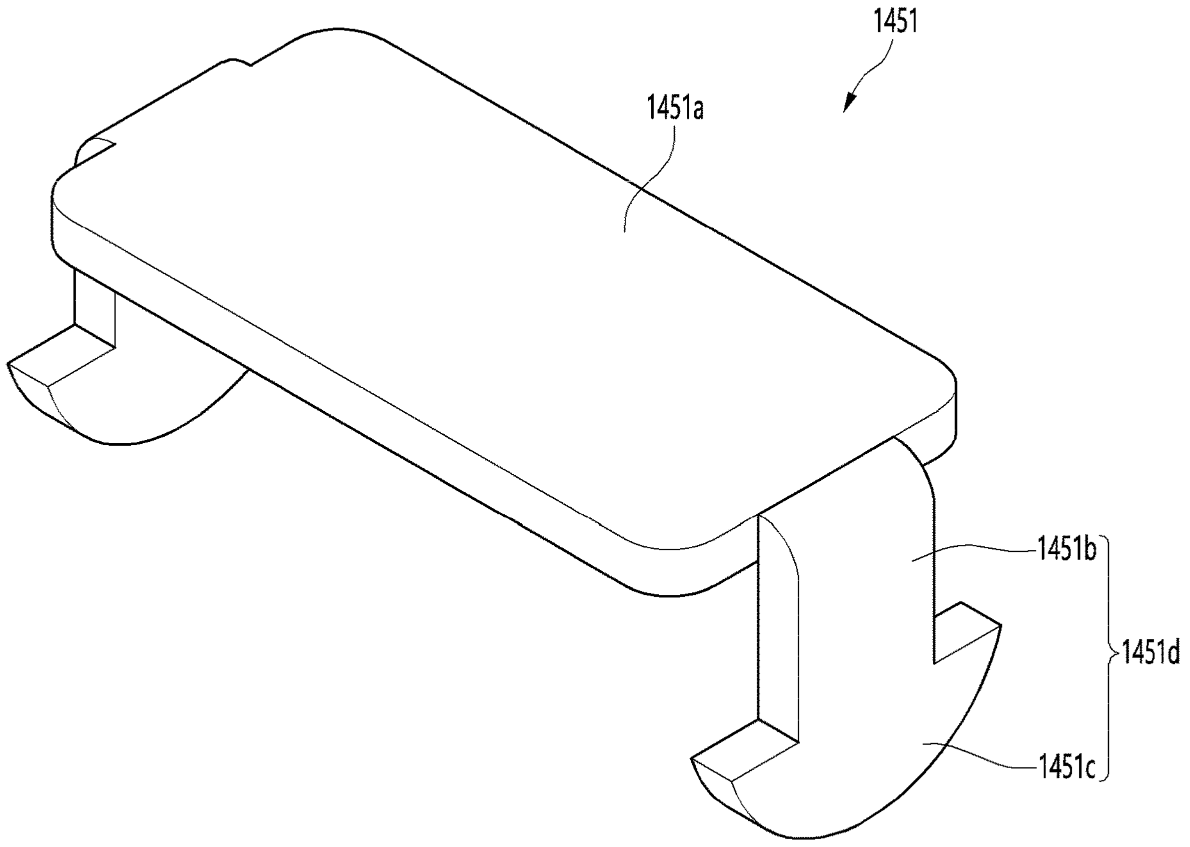
FIG. 15 is a perspective view an example of a magnetic body.
Figure 16:
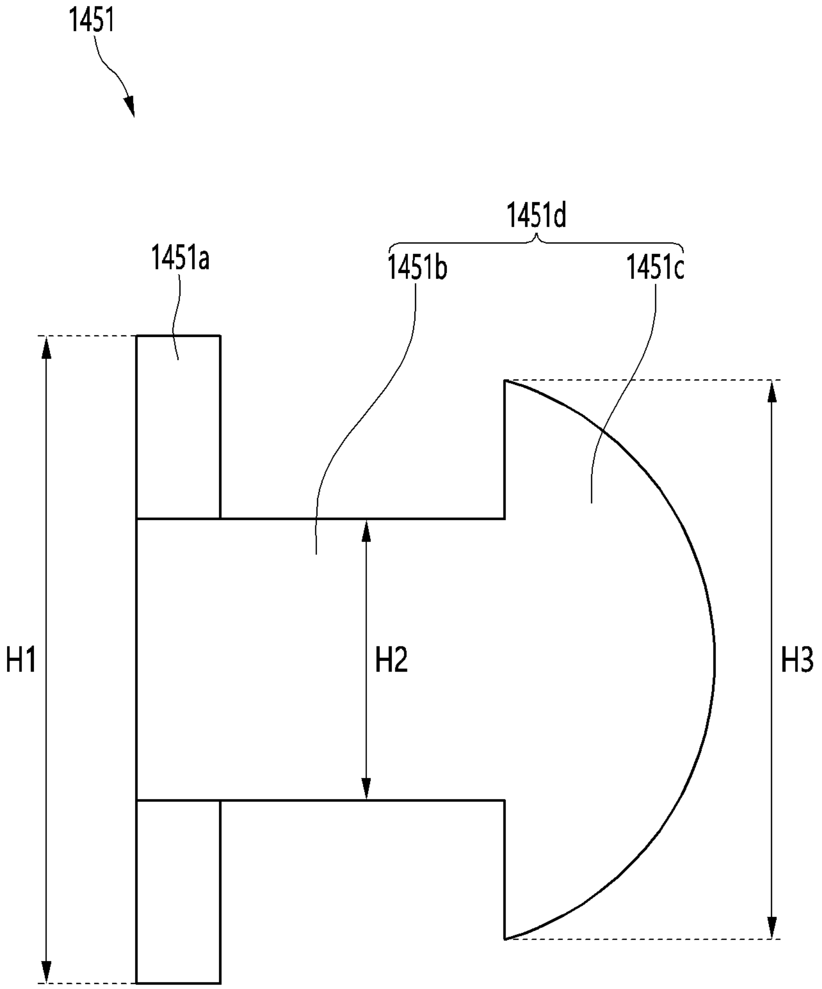
FIG. 16 is a side view of the magnetic body.
Figure 17:
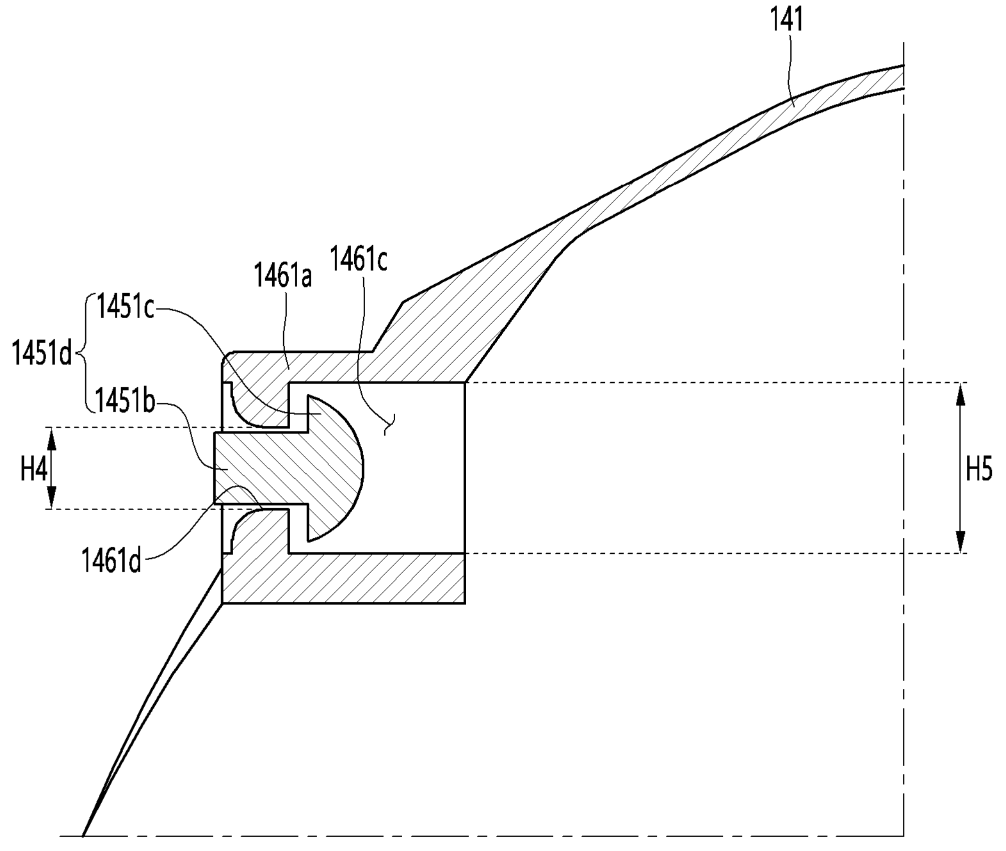
FIG. 17 is a longitudinal cross-sectional view showing an example of a magnetic body mounting portion to which the magnetic body is coupled.

FIG. 14 is an enlarged view of a portion "A" of FIG. 13, FIG. 15 is a perspective view showing an example of the magnetic body, FIG. 16 is a side view of the magnetic body, and FIG. 17 is a longitudinal cross-sectional view showing an example of the magnetic body mounting portion to which the magnetic body is coupled.

Referring to FIGS. 14 to 17, as described above, the magnetic bodies 1451 to 1453 can be separably inserted into the magnetic body mounting portions 1461 to 1463 of the face guard 14, respectively.

Since each of the magnetic body mounting portions 1461 to 1463 and each of the magnetic bodies 1451 to 1453 have the same shape or structure, the first magnetic body mounting portion 1461 and the first magnetic body 1451 will be representatively described below.

The first magnetic body mounting portion 1461 includes a mounting portion body 1461*a* protruding forward from an outer surface of the coupling portion 141, an insertion guide rib 1461*b* provided inside the mounting portion body 1461*a*, and an insertion hole 1461*c* defined between the mounting portion body 1461*a* and the insertion guide rib 1461*b*.

The mounting portion body 1461*a* can protrude in a hollow shape from a central point of an upper portion of the coupling portion 141. The mounting portion body 1461*a* can be provided in a shape into which the first magnetic body 1451 is inserted. For example, the mounting portion body 1461*a* can have a rectangular shape and can have opened front and rear surfaces.

The insertion guide rib 1461*b* serves to stably support the first magnetic body 1451 without oscillated while guiding the insertion position of the first magnetic body 1451. The first magnetic body 1451 of which the insertion position is guided by the insertion guide rib 1461*b* can be inserted into the insertion hole 1461*c*.

In detail, the insertion guide rib 1461*b* has a U-shape and is disposed at an inner center of the mounting portion body 1461*a*. Thus, a first insertion hole is defined between an inner circumferential surface of the mounting portion body 1461*a* and the left end of the insertion guide rib 1461*b*, and a second insertion hole 1461*c* is defined between an inner circumferential surface of the mounting portion body 1461*a* and the right end of the insertion guide rib 1461*b*.

That is, the insertion hole 1461*c* can be provided plurality, and both ends of the first magnetic body 1451 can be inserted into the plurality of insertion holes 1461*c*. When the first magnetic body 1451 is coupled to the mounting portion body 1461*a*, the fixing hook 1471*d* of the first magnetic body 1451 can be hooked and fixed to the insertion hole 1461*c*.

The first magnetic body 1451 is made of a material having magnetism, for example, made of iron or stainless steel. The first magnetic body 1451 can be provided in a U-shape or a "C" shape.

In detail, the first magnetic body 1451 includes a magnetic main body 1451*a* defining a main body and a fixing hook 1451*d* respectively extending backward from both ends of the magnetic main body 1451*a* and inserted into the plurality of insertion holes 1461*c*.

The magnetic main body 1451*a* can be provided in a rectangular plate shape. For example, the magnetic main body 1451*a* can be provided as a rectangular plate having a thickness in the front and rear direction and a long length in the left and right direction. In this case, the fixing hook 1451*d* can be provided to extend backward from each of left and right ends of the magnetic main body 1451*a*.

Particularly, the fixing hook 1451*d* includes an extension portion 1451*b* extending by a predetermined length backward from a center of both ends of the magnetic main body 1451*a* and a hook portion 1451*c* having a hook shape at an end of the extension portion 1451*b*. The hook portion 1451*c* can be provided to increase in radius from the end of the extension portion 1451*b* in the vertical direction.

Here, a height H3 of the hook portion 1451*c* in the vertical direction is less than a height H1 of the magnetic main body 1451*a* in the vertical direction and greater than a height H2 of the extension portion 1451*b* in the vertical direction.

In addition, the vertical height H2 of the extension 1451*b* is slightly less than a vertical height H4 of an insertion slit 1461*d* provided in the mounting portion body 1461*a*. In addition, the vertical height H3 of the hook portion 1451*c* is provided to be greater than the vertical height H4 of the insertion slit 1461*d* and is provided to be less than a vertical height H5 of the of the insertion hole 1461*c* of the mounding portion body 1461*a*.

Here, since the magnetic body mounting portion 1461 is molded of a silicone or rubber material having elasticity, the fixing hook 1451*d* can be inserted into the insertion hole 1461*c* of the mounting portion body 1461*a* in a press-fitting manner.

Then, as illustrated in FIG. 17, in a state in which the hook portion 1451*c* is accommodated in the insertion hole 1461*c*, the hook portion is prevented from being separated to the outside through the insertion slit 1461*d*.

Figure 18:
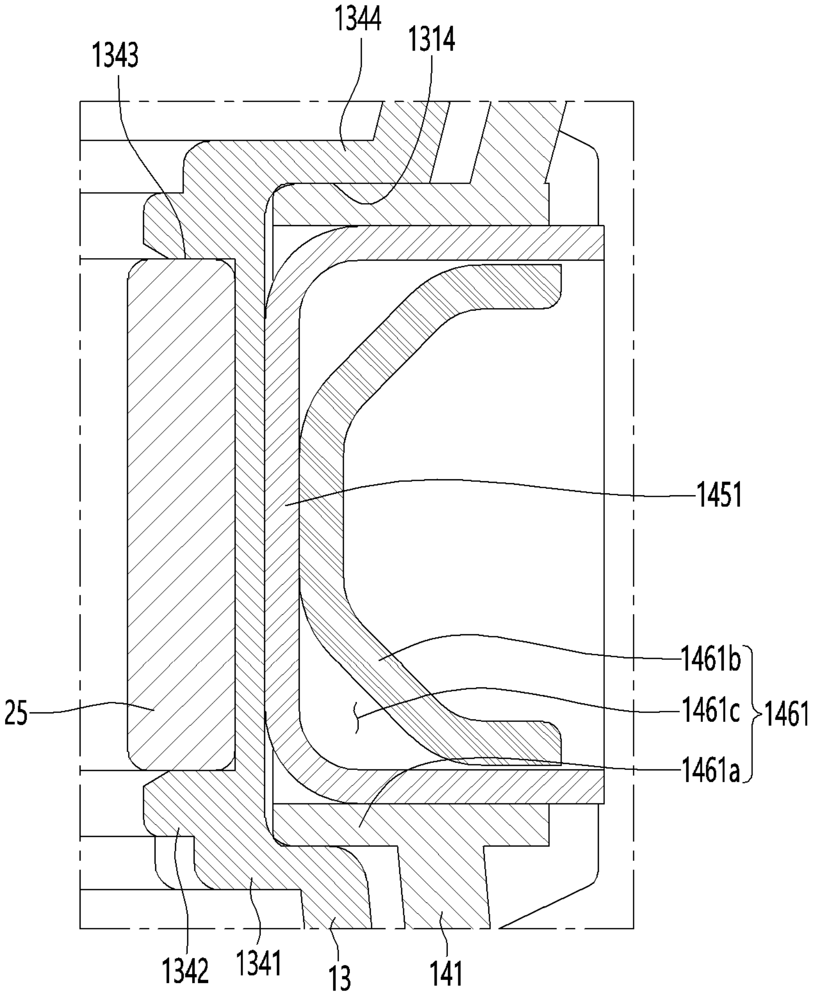
FIG. 18 is a transverse cross-sectional view illustrating an example of a magnet mounting portion of the rear body coupled to the magnetic body mounting portion of the face guard.

FIG. 18 is a transverse cross-sectional view illustrating a state in which the magnet mounting portion of the rear body and the magnetic body mounting portion of the face guard are coupled to each other.

As described above, an upper magnet mounting portion 134 and a pair of lower magnet mounting portions 135 are disposed on the front surface of the rear body 13, and a magnet mounting groove 1314 is defined in each of the rear surface of the rear body 13 corresponding to a direct rear surface of the upper magnet mounting portion 134 and the rear surface of the rear body 13 corresponding to a direct rear surface of each of the pair of lower magnet mounting portions 135.

The magnet mounting groove 1314 includes a first magnet mounting groove 1311 defined in a direct rear surface of the upper magnet mounting portion 134 and a second magnet mounting groove 1312 and a third magnet mounting groove 1313, which are defined in a direct rear surface of the lower magnet mounting portion 135.

Three magnetic bodies 1451 to 1453 mounted on the face guard 14 are attached to the first to third magnet mounting grooves 1311 to 1313 by magnetic force, respectively. In addition, when the user pulls the face guard 14 with force greater than the magnetic force, the face guard 14 is easily separated from the rear body 13.

Since the upper magnet mounting portion 134 and the pair of magnet mounting portions 135 have the same shape or structure except for their positions, a method in which the first magnetic body mounting portion 1461 is coupled to the upper magnet mounting portion 134 will be representatively described below.

Referring to FIG. 18, the upper magnet mounting portion 134 includes a magnet mounting portion main body 1341 that defines a seating space 1343 in which the magnet 25 is seated.

The magnet mounting portion main body 1341 can protrude forward from the front surface of the rear body 13, and a portion of a front surface thereof can be recessed backward to define the seating space 1343.

In addition, a pair of first guide ribs 1342 for holding both ends of the magnet 25 inserted into the seating space 1343 can be disposed on both sides of the front side of the magnet mounting portion main body 1341, respectively. The pair of first guide ribs 1342 can protrude forward from a front surface of the magnet mounting portion main body 1341 corresponding to an edge of the seating space 1343.

Due to the structure of the pair of first guide ribs 1342, the magnet 25 can be deeply inserted into the seating space 1343 and stably supported.

In addition, a pair of second guide ribs 1344 for holding both ends of the first magnetic body mounting portion 1461 inserted into the magnet mounting groove 1314 can be disposed at both sides of the rear surface of the magnet mounting portion main body 1341. The pair of second guide ribs 1344 can protrude backward from a rear surface of the magnet mounting portion main body 1341 corresponding to an edge of the magnet mounting groove 1314.

Due to the structure of the pair of second guide ribs 1344, the first magnetic body mounting portion 1461 can be deeply inserted into the magnet mounting groove 1314 and stably supported.

When the first magnetic body mounting portion 1461 is inserted into the magnet mounting groove 1314, the first magnetic body 1451 and the magnet 25 face each other, and as a distance between the first magnetic body 1451 and the magnet 25 decreases, the first magnetic body mounting portion 1461 and the upper magnet mounting portion 134 can be coupled to each other by magnetic force.

Thus, it is easy to attach and detach the face guard 14 to/from the rear body 13, and there is an advantage in that the face guard 14 is prevented from being easily separated from the rear body 13.

The mask apparatus including the above-described constitutions can have following effects.

In some implementations, where both the suction hole and the discharge hole of the mask apparatus are disposed on the rear surface of the mask body covering the user's face, the flow resistance can be significantly reduced when compared to the case in which the suction hole of the mask apparatus is defined in the front surface of the mask body or other portions except for the mask body.

In some implementations, where the suction hole is not exposed to the outside while the user wears the mask apparatus, a separate cover member may not be provided to cover the suction hole. Furthermore, since a separate cover member is not provided to be mounted on the front surface of the mask apparatus, there can be the effect that the cover member is not damaged or separated by the external force.

In some implementations, where the suction hole is defined in the rear surface of the mask body, when the mask apparatus is taken off so that the front surface of the mask body is faced forward or upward, the introduction of the dust or other foreign substances into the mask apparatus through the suction hole can be minimized.

In some implementations, where the face guard is coupled to the mask body by the magnetic force without the separate coupling structure, the face guard can be easily mounted and detached.

For instance, since one magnetic body mounting portion exists in the center of the upper portion of the face guard and two magnetic body mounting portions exist at the lower portion of the face guard, if the magnetic body mounting portion disposed on the upper portion of the face guard is attached first to the mask body, the coupling position of the remaining two magnetic bodies can be determined.

Thus, in some cases, there may be no need to align all of the plurality of magnetic body mounting portions at the corresponding positions of the mask body, and there may be no possibility of the defective coupling, and thus, the mounting and separation of the face guard is convenient.

In some implementations, where the magnetic body is smoothly inserted by the insertion guide rib provided inside the magnetic body mounting portion, the mounting and separation of the magnetic body can be convenient.

In some implementations, the magnetic body can include the magnetic body and the pair of fixing hooks extending backward from both the ends of the magnetic body, and the fixing hooks can be inserted into the mounting portion body in the press-fitting manner. The magnetic body can be prevented from being separated from the magnetic body mounting portion.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mask apparatus comprising:

a mask body that defines a suction hole configured to receive external air from an outside of the mask apparatus and a discharge hole configured to discharge air to the outside, the mask body comprising a rear body and a front body that is coupled to a front surface of the rear body;

a face guard detachably coupled to a rear surface of the rear body by magnetic force and configured to be in contact with a face of a user, the face guard defining a breathing space; and an air cleaning module disposed at the rear body and configured to filter the external air received through the suction hole and to supply the filtered air to the breathing space, the air cleaning module comprising a filter housing configured to accommodate a filter, wherein the face guard comprises:

a coupling portion that faces the rear surface of the rear body, a plurality of magnetic bodies disposed at a front surface of the coupling portion, a close contact portion configured to be in contact with the face of the user, and a connection portion that connects the coupling portion to the close contact portion, the connection portion defining one or more widths of the face guard in a front-rear direction, wherein the plurality of magnetic bodies comprise:

a first magnetic body disposed at an upper portion of the front surface of the coupling portion, the first magnetic body being disposed at a center of the upper portion of the front surface of the coupling portion, and a second magnetic body and a third magnetic body that are disposed at a lower portion of the front surface of the coupling portion, the second and third magnetic bodies being spaced apart from each other and disposed at sides of a center of the lower portion of the front surface of the coupling portion, respectively, wherein the face guard defines a plurality of magnetic body mounting portions that receive the plurality of magnetic bodies, respectively, wherein each of the plurality of magnetic body mounting portions comprises:

a mounting portion body that protrudes forward from the front surface of the coupling portion toward one of a plurality of magnet mounting grooves of the rear body, and an insertion guide rib disposed inside the mounting portion body, and wherein the mounting portion body and the insertion guide rib are spaced apart from each other to thereby define an insertion hole that receives one of the plurality of magnetic bodies between the mounting portion body and the insertion guide rib.

2. The mask apparatus according to claim 1, wherein the first magnetic body is disposed at a position corresponding to an upper side of the air cleaning module, and wherein the second and third magnetic bodies are disposed at positions corresponding to a lower side of the air cleaning module.

3. The mask apparatus according to claim 1, wherein the suction hole is defined outside the breathing space, and the discharge hole is defined inside the breathing space.

4. The mask apparatus according to claim 3, wherein the first magnetic body is disposed at a position corresponding to an upper side of the discharge hole, and wherein the second and third magnetic bodies are disposed at positions corresponding to a lower side of the discharge hole.

5. The mask apparatus according to claim 1, wherein each of the plurality of magnetic body mounting portions protrudes from the front surface of the coupling portion and is attached to the rear surface of the rear body.

6. The mask apparatus according to claim 5, wherein the rear body comprises:

a plurality of magnets that are disposed at the front surface of the rear body; and a plurality of magnet mounting portions that protrude forward from the front surface of the rear body, each of the plurality of magnet mounting portions receiving one of the plurality of magnets, and wherein the rear body defines the plurality of magnet mounting grooves at the rear surface of the rear body, each of the plurality of magnet mounting grooves being defined at a position corresponding to a rear surface of one of the plurality of magnet mounting portions.

7. The mask apparatus according to claim 1, wherein the mounting portion body defines:

an inner space that accommodates the insertion guide rib and the one of the plurality of magnetic bodies; and a front opening that is in communication with the inner space and faces the rear surface of the rear body.

8. The mask apparatus according to claim 7, wherein each of the plurality of magnetic bodies is separably coupled to the mounting portion body of one of the plurality of magnetic body mounting portions through the front opening of the one of the plurality of magnetic body mounting portions.

9. The mask apparatus according to claim 1, wherein the filter housing is disposed at the rear body and defines the suction hole, the filter housing being configured to accommodate the filter at the suction hole.

10. The mask apparatus according to claim 9, wherein the face guard is disposed at a center portion of the rear body, wherein the filter housing is disposed at at least one side of the center portion of the rear body, and wherein the face guard separates the discharge hole from the suction hole.

11. The mask apparatus according to claim 10, wherein the suction hole is defined outside the breathing space, and the discharge hole is defined inside the breathing space.

12. The mask apparatus according to claim 1, further comprising a plurality of magnets that are disposed at the rear body and configured to provide the magnetic force to the plurality of magnetic bodies, respectively, to thereby couple the face guard to the rear body, and wherein each of the plurality of magnetic bodies is made of iron or stainless steel.

* * * * *